(12) United States Patent
Terajima et al.

(10) Patent No.: US 10,317,290 B2
(45) Date of Patent: Jun. 11, 2019

(54) CONTACT

(71) Applicant: Tyco Electronics Japan G.K., Kanagawa (JP)

(72) Inventors: Keita Terajima, Kanagawa (JP); Eiichiro Takemasa, Kanagawa (JP); Akira Torigoe, Kanagawa (JP)

(73) Assignee: Tyco Electronics Japan G.K., Kanagawa (JP)

( * ) Notice: Subject to any disclaimer, the term of this patent is extended or adjusted under 35 U.S.C. 154(b) by 0 days.

(21) Appl. No.: 15/653,958

(22) Filed: Jul. 19, 2017

(65) Prior Publication Data

US 2018/0024012 A1    Jan. 25, 2018

(30) Foreign Application Priority Data

Jul. 19, 2016 (JP) ................... 2016-141591

(51) Int. Cl.
*G01K 7/02* (2006.01)
*H01R 13/04* (2006.01)
*H01R 13/502* (2006.01)
*H01R 24/20* (2011.01)
*H01R 4/62* (2006.01)
*H01R 13/03* (2006.01)
*H01R 13/187* (2006.01)
*H01R 101/00* (2006.01)

(52) U.S. Cl.
CPC ............. *G01K 7/023* (2013.01); *H01R 4/62* (2013.01); *H01R 13/035* (2013.01); *H01R 13/04* (2013.01); *H01R 13/187* (2013.01); *H01R 13/502* (2013.01); *H01R 24/20* (2013.01); *H01R 2101/00* (2013.01); *H01R 2201/20* (2013.01)

(58) Field of Classification Search
CPC ............. G01K 7/023; H01R 2201/20; H01R 2101/00; Y10T 29/49208
USPC ................... 439/879, 921, 181, 186
See application file for complete search history.

(56) References Cited

U.S. PATENT DOCUMENTS 3,210,720 A * 10/1965 Harris, Jr. ............... H01R 4/56
                                                          439/281
3,568,137 A *  3/1971 Youngblut ............... H01R 4/18
                                                          439/865
(Continued)

FOREIGN PATENT DOCUMENTS

JP        5205802 A      8/1993
JP      200556603 A      3/2005
(Continued)

OTHER PUBLICATIONS

European Search Report, dated Oct. 25, 2017, 8 pages.

*Primary Examiner* — Ross N Gushi
(74) *Attorney, Agent, or Firm* — Barley Snyder

(57) ABSTRACT

A contact preventing a plurality of current paths joining together and having a contact main body having a wire fixing portion and a contacting member which is a member formed separately from the contact main body is provided. The contact has a contact main body having a wire fixing portion to which a wire is fixed and a contacting member formed separately from the contact main body and configured to be connected to the wire and contact with a mating contact. A portion of the contact main body, contacting with the contacting member has an insulation layer.

19 Claims, 18 Drawing Sheets

(56) References Cited

U.S. PATENT DOCUMENTS

| | | | | |
|---|---|---|---|---|
| 3,656,092 | A * | 4/1972 | Swengel, Sr. | H01R 4/029 439/730 |
| 4,031,614 | A * | 6/1977 | Gipe | H01R 43/16 29/879 |
| 4,645,278 | A * | 2/1987 | Yevak, Jr. | H01R 13/447 228/212 |
| 4,944,686 | A * | 7/1990 | Gertz | H01R 4/5033 439/175 |
| 5,035,655 | A * | 7/1991 | Hesse | H01R 4/185 439/699.2 |
| 5,315,065 | A * | 5/1994 | O'Donovan | H01R 4/20 174/84 C |
| 5,348,498 | A * | 9/1994 | Morello | H01R 4/185 439/877 |
| 5,399,110 | A * | 3/1995 | Morello | H01R 4/185 439/879 |
| 5,675,891 | A * | 10/1997 | Childs | B23K 1/002 29/879 |
| 5,716,246 | A * | 2/1998 | Kerckhof | H01R 13/04 439/884 |
| 5,846,093 | A * | 12/1998 | Muench, Jr. | H01R 13/53 439/89 |
| 5,888,107 | A * | 3/1999 | Seymour | H01R 13/04 439/866 |
| 6,004,172 | A * | 12/1999 | Kerek | H01R 13/10 439/879 |
| 6,146,211 | A * | 11/2000 | Okamoto | H01R 13/04 439/181 |
| 6,290,556 | B1 * | 9/2001 | Howland | H01R 4/188 439/879 |
| 6,328,615 | B1 * | 12/2001 | Safai | H01R 13/03 439/825 |
| 7,338,334 | B2 * | 3/2008 | Kumakura | H01R 43/16 29/857 |
| 7,371,133 | B1 * | 5/2008 | Morello | H01R 13/187 439/852 |
| 7,422,494 | B2 * | 9/2008 | Fry, Jr. | H01R 13/15 439/891 |
| 7,442,097 | B2 * | 10/2008 | Kumakura | H01R 43/16 29/851 |
| 7,556,541 | B2 * | 7/2009 | Tyler | H01R 13/03 439/843 |
| 7,976,353 | B2 * | 7/2011 | Myer | H01R 13/04 439/891 |
| 8,979,602 | B2 * | 3/2015 | Cappe | H01R 13/04 439/884 |
| 9,225,106 | B2 * | 12/2015 | Oduca | H01R 43/048 |
| 9,431,739 | B2 * | 8/2016 | Fukushima | H01R 13/44 |
| 9,799,976 | B2 * | 10/2017 | Lehner | H01R 13/04 |
| 9,812,802 | B2 * | 11/2017 | Terajima | H01R 24/28 |
| 2012/0009828 | A1 | 1/2012 | Yagi et al. | |
| 2014/0057502 | A1 * | 2/2014 | Takayama | H01R 4/16 439/877 |
| 2015/0079825 | A1 * | 3/2015 | Miyamoto | H01R 4/206 439/152 |
| 2015/0140876 | A1 | 5/2015 | Lehner et al. | |
| 2017/0040726 | A1 * | 2/2017 | Terajima | H01R 4/023 |
| 2018/0024012 | A1 * | 1/2018 | Terajima | G01K 7/023 |

FOREIGN PATENT DOCUMENTS

| | | |
|---|---|---|
| JP | 201238560 A | 2/2012 |
| JP | 2012150998 A | 8/2012 |
| WO | 2008045191 A2 | 4/2008 |
| WO | 2013161551 A1 | 10/2013 |

* cited by examiner

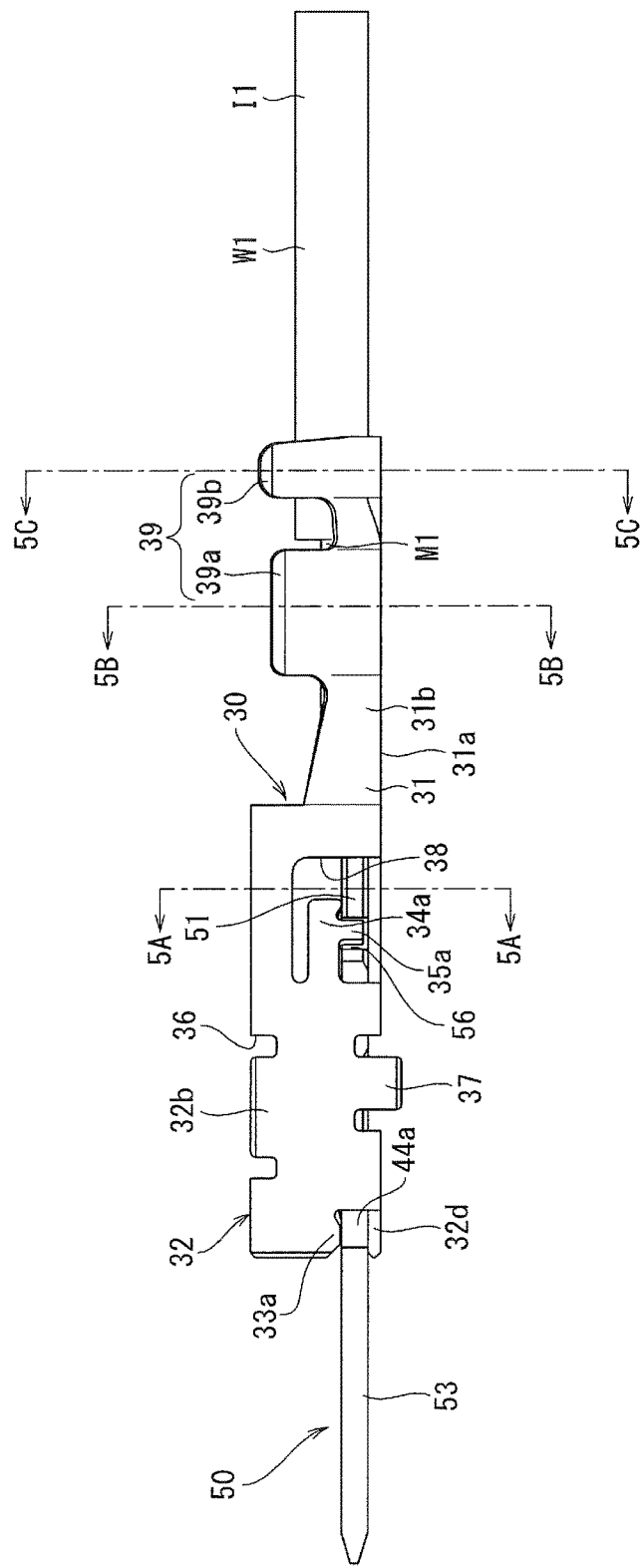

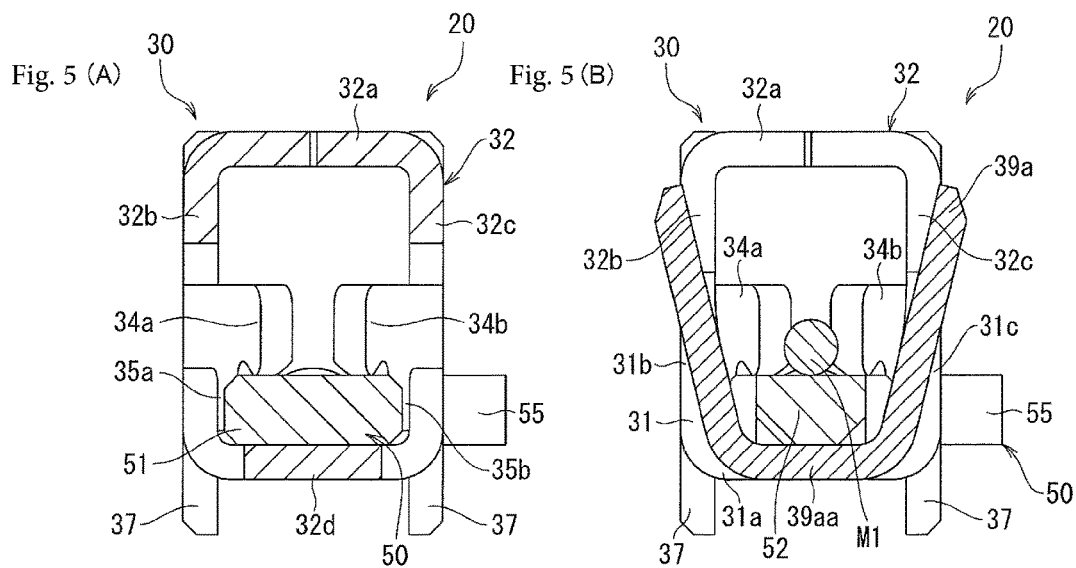
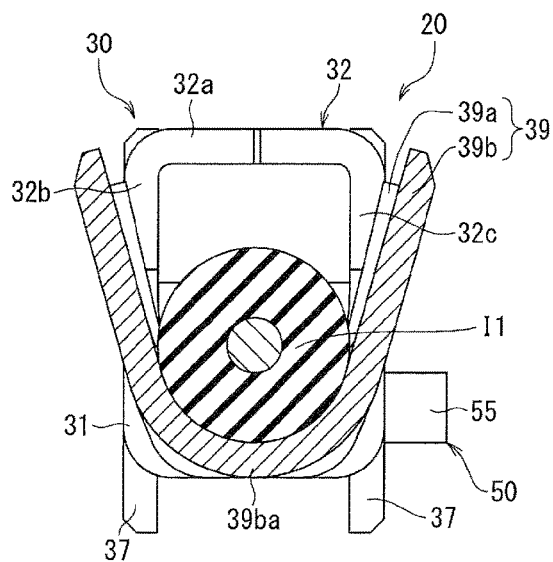

CONTACT

CROSS-REFERENCE TO RELATED APPLICATION

This application claims the benefit of the filing date under 35 U.S.C. § 119(a)-(d) of Japanese Patent Application No. 2016-141591, filed on Jul. 19, 2016.

FIELD OF THE INVENTION

The present invention relates to a contact having a contact main body having a wire fixing portion and a contacting member forming a member formed separately from the contact main body.

BACKGROUND

In one form of a contact used for an electric connector, the contact main body has a wire fixing portion and a separately formed contacting member, such as a tab. Such a contact is shown in JP2012-150998A. The contact shown in JP2012-150998A has a contact main body that has a wire fixing portion and a contacting member made up of a tab forming a member formed separately from the contact main body. A back end portion of the contacting member is coupled to a front end portion of the contact main body in an electrically conductible manner. Further, the contact main body and the contacting member are formed with a catching portion for restricting forward separation of the contacting member from the contact main body.

However, when the conventional contact shown in JP2012-150998A is used for temperature measurement utilizing a thermocouple, there is the following problem. A first current path where a current flows from a core wire made of a material for a thermocouple to the tab and a second current path where a current flows from the core wire to the tab via the contact main body are in existence. Therefore, there is such a problem that an error is caused in a thermoelectric force to be measured, which results in lowering of accuracy of the temperature measurement.

SUMMARY

A contact according to one aspect of the present invention includes a contact main body having a wire fixing portion configured to be fixed with a wire, a contacting member formed separately from the main body and configured to be connected to the wire and contact with a mating contact, and an insulation layer on a portion of the contact main body contacting with the contacting member.

BRIEF DESCRIPTION OF DRAWINGS

FIG. 4 is a right side view of the first contact shown in FIG. 1 before a wire is connected together with the first contact.

FIG. 5(A) is a cross-sectional view taken along 5A-5A in FIG. 4.

FIG. 5(B) is a cross-sectional view taken along line 5B-5B in FIG. 4.

FIG. 5(C) is a cross-sectional view taken along line 5C-5C in FIG. 4.

FIG. 18(A) being a perspective view

FIG. 18(B) is a cross-sectional view of the modified embodiment of the third contact which has been cut in the front/back direction.

BRIEF DESCRIPTION OF THE EMBODIMENT(S)

Embodiments of the present invention will be explained below with reference to the drawings.

Figure 1:
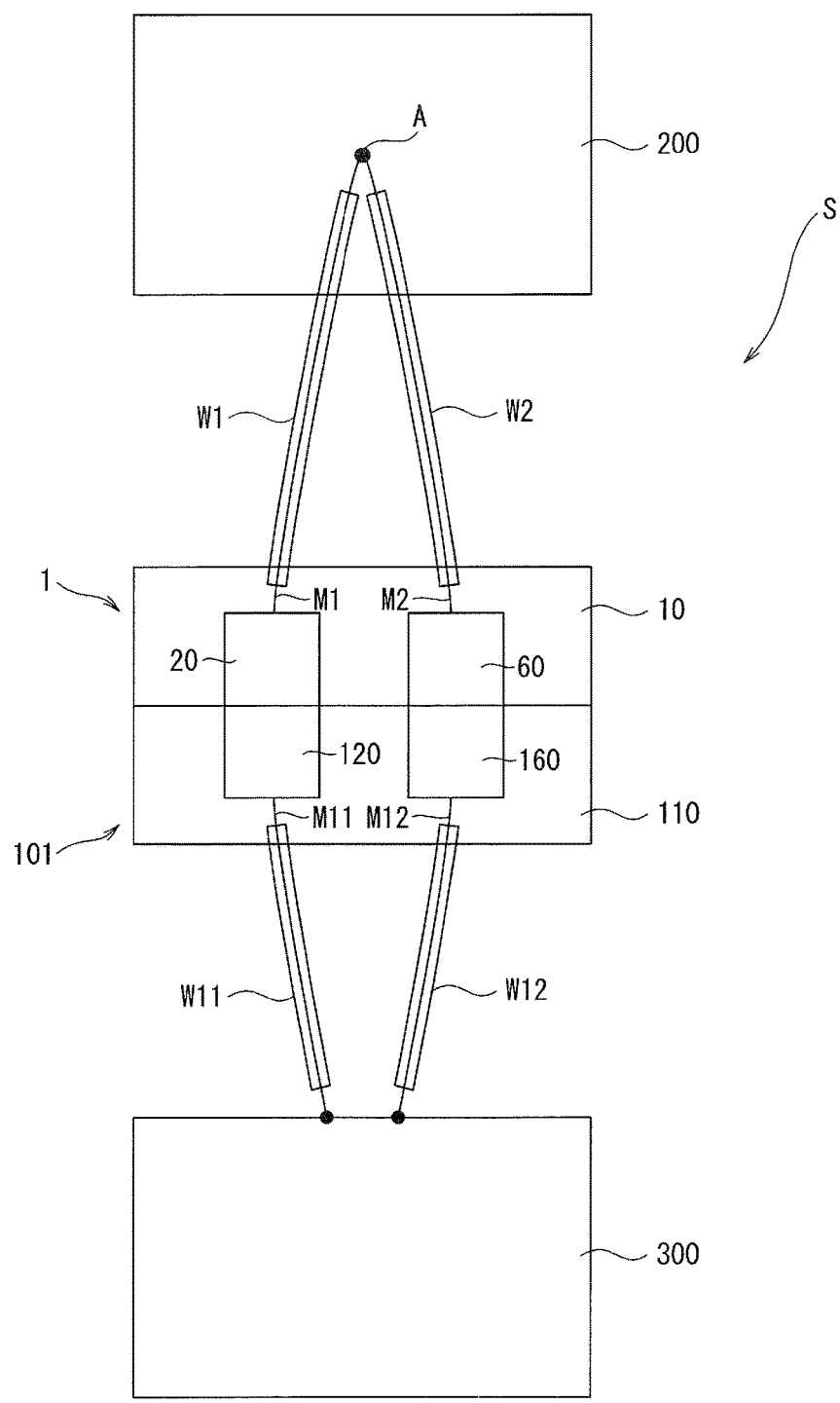
FIG. 1 is a schematic diagram of a temperature measurement apparatus using a first connector provided with first and second contacts, and a second connector provided with third and fourth contacts according to an embodiment of the present invention.

In FIG. 1, for example, the temperature measurement apparatus S is configured so as to measure a temperature within a chamber 200 receiving a silicon wafer by utilizing a thermocouple in a semiconductor manufacturing apparatus.

That is to say, a wire W1 having a core wire M1 made of a metal material for a thermocouple and a wire W2 having a core wire M2 made of a metal material for a thermocouple of a different kind from that of the M1 are prepared. A material of the core wire M1 is chromel, while a material of the core wire M2 is alumel, for example.

A joining point A of one end of the core wire M1 of the wire W1 and one end of the core wire M2 of the wire W2 is arranged within the chamber 200. Further, the other end of the core wire M1 of the wire W1 is connected to the first contact 20 of the first connector 1, while the other end of the core wire M2 of the wire W2 is connected to the second contact 60 of the first connector 1. Here, the first connector 1 is provided with a plurality of first contacts 20 and a plurality of second contacts 60 and a housing 10 receiving the first contacts 20 and the second contacts 60.

Further, a wire W11, similar to the above-described wire W1, and a wire W12, similar to the above-described wire W2, are prepared and one end of a core wire M11 of the wire W11 and one end of a core wire M12 of the wire W12 are connected to a data logger 300. Further, the other end of the core wire M11 of the wire W11 is connected to the third contact 120 of the second connector 101, while the other end of the core wire M12 of the wire W12 is connected to the fourth contact 160 of the second connector 101. Here, the second connector 101 is provided with a plurality of third contacts 120 and a plurality of fourth contacts 160 and a housing 110 receiving the third contacts 120 and the fourth contacts 160.

Then, the first connector 1 is mated with the second connector 101, so that the first contact 20 and the third contact 120 are caused to contact with each other to be electrically connected to each other, while the second contact 60 and the fourth contact 160 are caused to contact with each other to be electrically connected to each other.

Thereby, the core wire M1 of the wire W1 and the core wire M11 of the wire W11 are connected to each other, while the core wire M2 of the wire W2 and the core wire M12 of the wire W12 are connected to each other. Thereby, the data logger 300 detects a temperature within the chamber 200 in response to an electromotive force generated at the joining point A and further records the temperature. It should be noted that a mating state of the first connector 1 and the second connector 101 can be cancelled at a maintenance time of the data logger 300 or the like.

Next, the first contact 20 used in the first connector 1 of the temperature measurement apparatus S will be explained in detail with reference to FIG. 2 to FIG. 9. It should be noted that the terms "front", "back", "left", "right", "upper" and "lower" indicating directions are used hereinafter in this specification, but explanation is conducted such that the left is "left", the right is "right", the upper is "upper", and the lower is "lower" in FIG. 3, while the left is "front" and the right is "back" in FIG. 4. This definition of the directions also holds true for FIG. 10 to FIG. 18.

The first contact 20 is provided with a contact main body 30 and a contacting member 50 forming a member formed separately from the contact main body 30.

Figure 2:
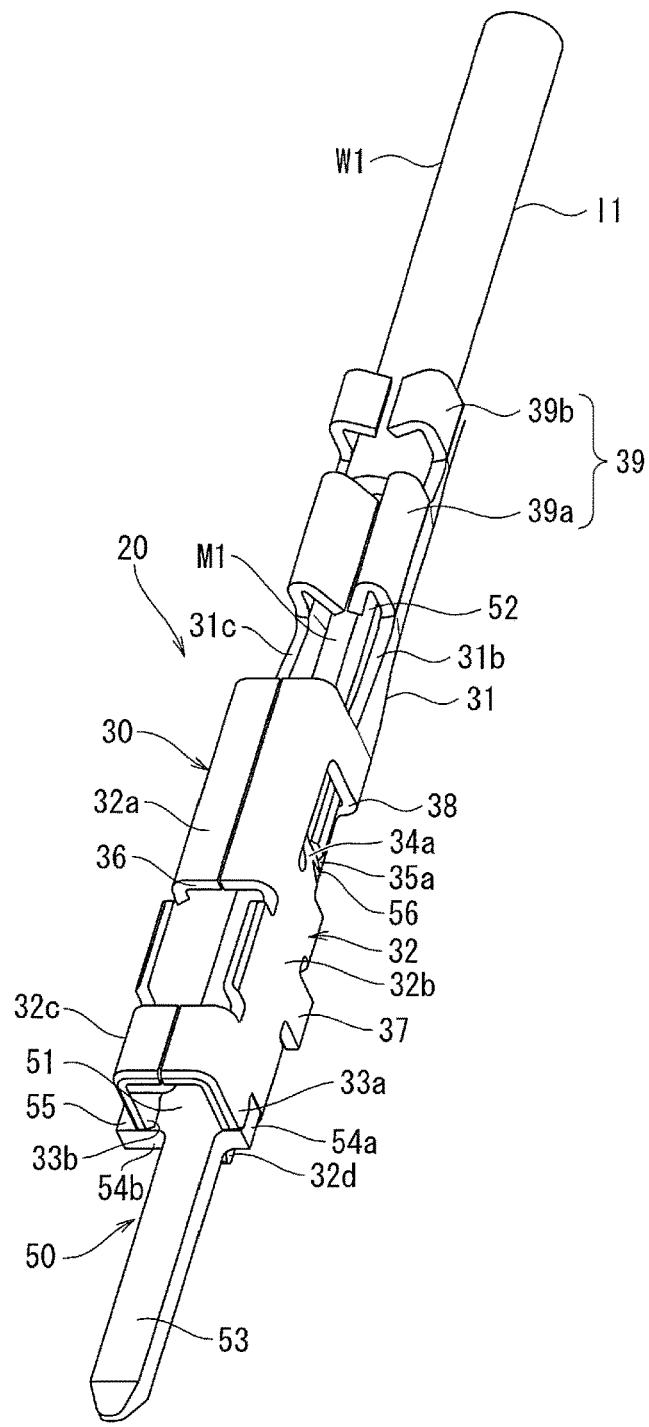
FIG. 2 is a perspective view of a state where a wire has been connected to the first contact shown in FIG. 1.
Figure 3:
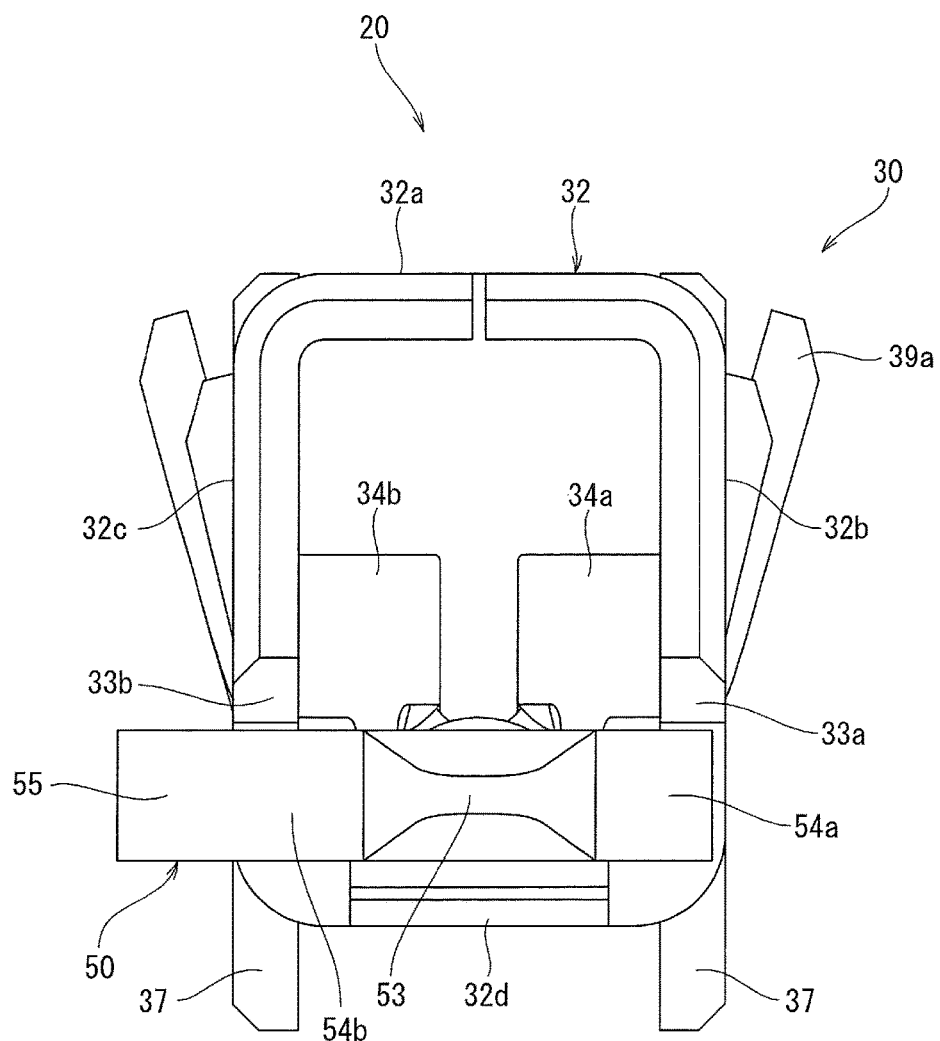
FIG. 3 is a front view of the first contact shown in FIG. 1.

As shown in FIG. 2 to FIG. 4, the contact main body 30 is provided with a base portion 31, a contacting member fixing portion 32 arranged on the front side of the base portion 31, and a wire fixing portion 39 arranged on the back side of the base portion 31. The contact main body 30 is formed by stamping and forming a conductive metal plate (for example, a stainless steel plate) made of a metal material of a type different from the core wire M1.

Figure 6:
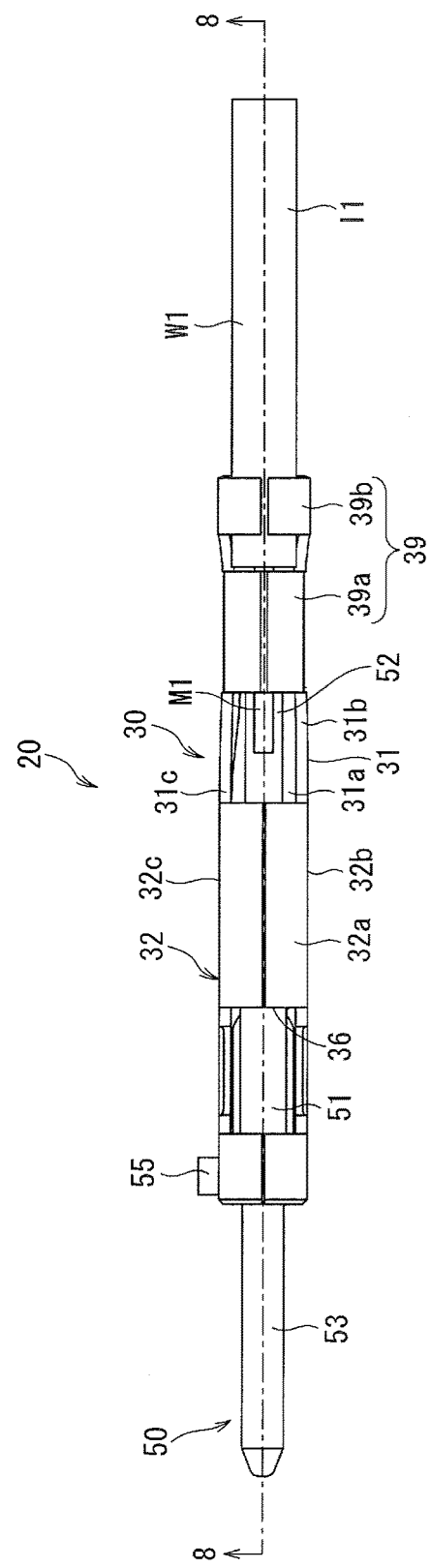
FIG. 6 is a top view of a state where a wire has been connected to the first contact shown in FIG. 1.
Figure 7:
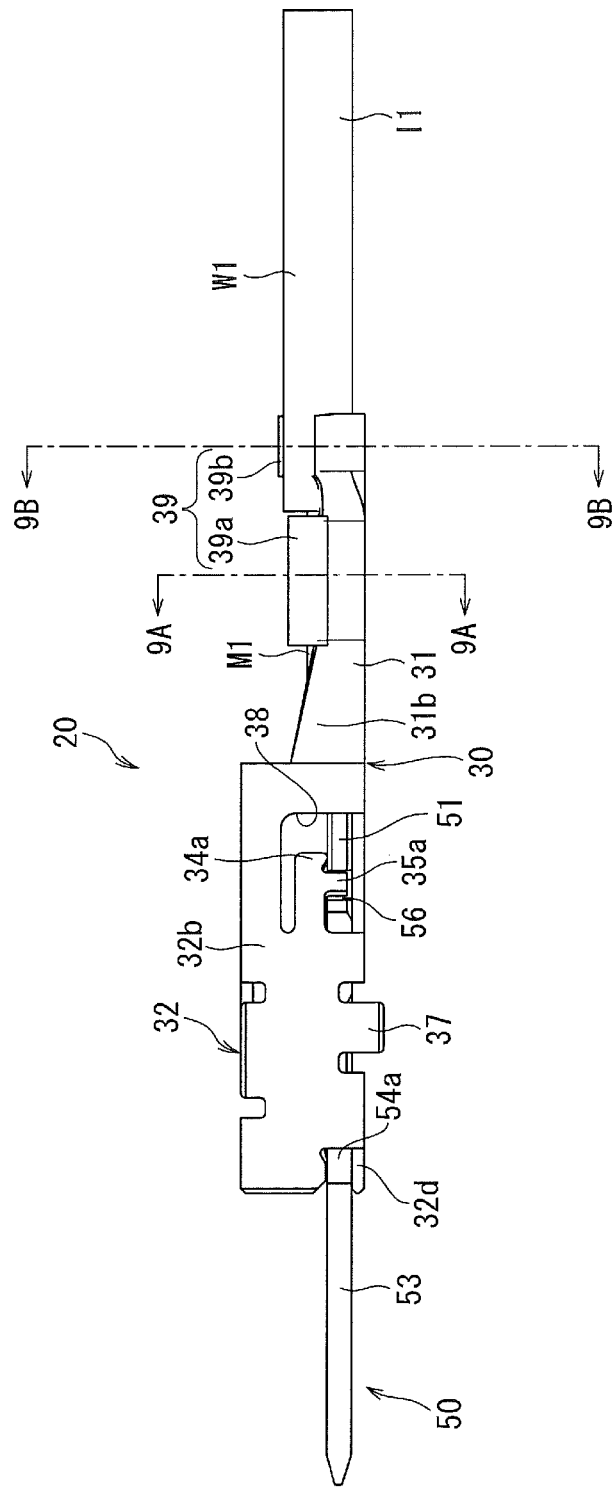
FIG. 7 is a right side view of a state where a wire has been connected to the first contact shown in FIG. 1.

Here, as shown in FIG. 2, FIG. 4 and FIG. 6, the base portion 31 is provided with a flat plate-like base plate portion 31a extending in a front/back direction and in a left/right direction, a right side wall 31b upstanding from a right edge of the base plate portion 31a, and a left side wall 31c upstanding from a left edge of the base plate portion 31a.

Figure 8:
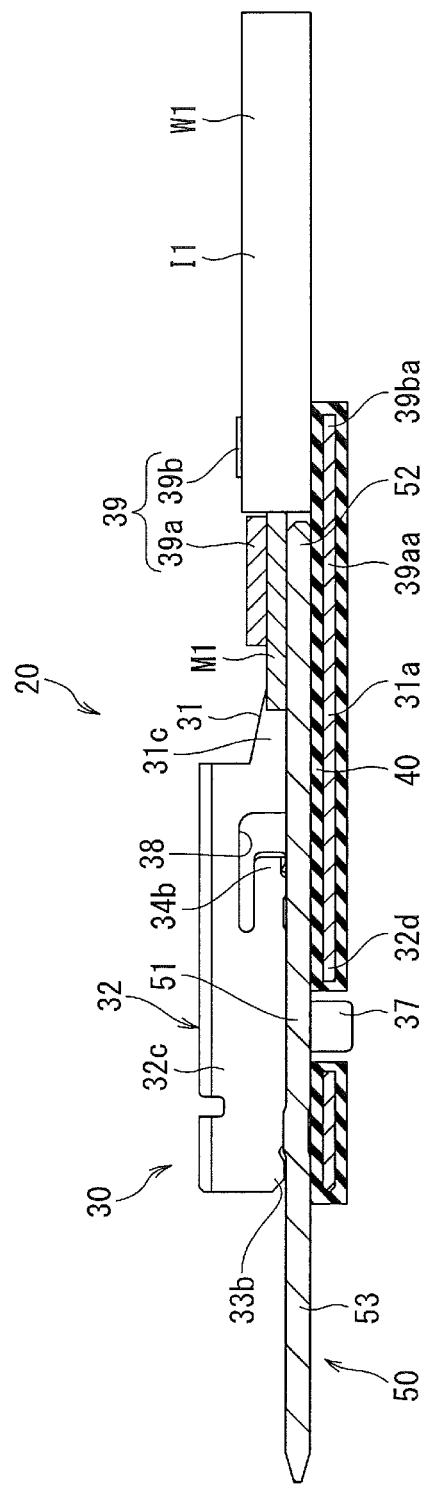
FIG. 8 is a cross-sectional view taken along line 8-8 in FIG. 6.
Figure 9:
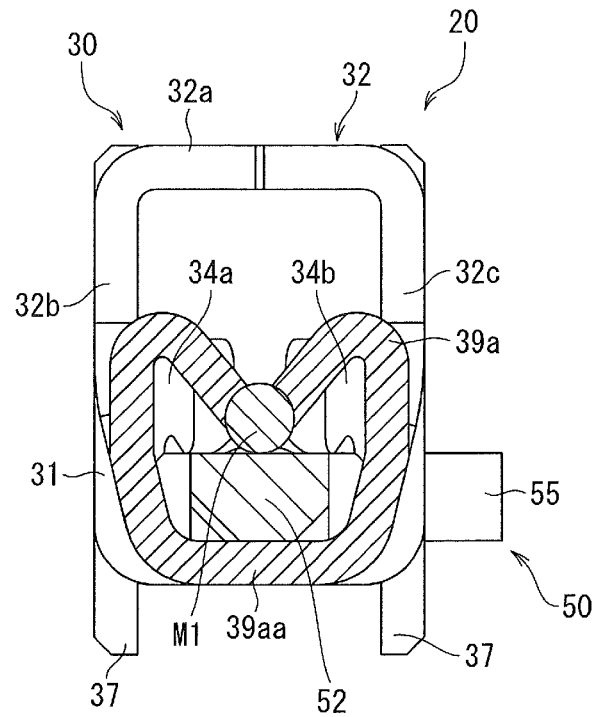
FIG. 9(A) is a cross-sectional view taken along line 9A-9A in FIG. 7.
FIG. 9(B) is a cross-sectional view taken along line 9B-9B in FIG. 7.
Figure 9:
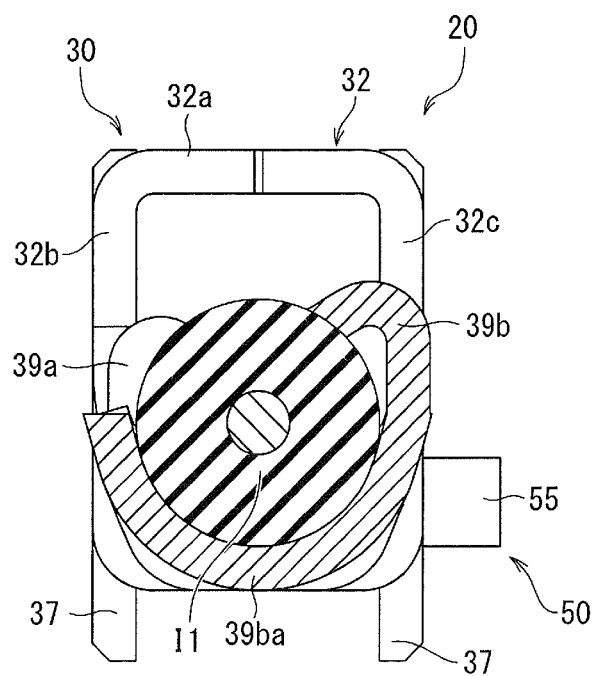

Further, the contacting member fixing portion 32 is formed in an approximately box-like shape in which the contacting member 50 can be inserted from the front and it is provided with an upper wall 32a, a right side wall 32b, a left side wall 32c, and a bottom plate 32d, as shown in FIG. 2 and FIG. 3. As shown in FIG. 8, the bottom wall 32d extends forward from the base plate portion 31a of the base portion 31 in an approximately rectangular flat plate-like shape. Further, the right side wall 32b extends upward from a right edge of the bottom plate 32d in an approximately rectangular flat plate-like shape. Furthermore, the left side wall 32c extends upward from a left edge of the bottom plate 32d in an approximately rectangular flat plate-like shape. In addition, the upper wall 32a has portions extending inward from the right side wall 32b and the left side wall 32c, respectively, to join together at a central portion in the left/right direction.

Then, as shown in FIG. 2, a front end of the right side wall 32b has a first press-fitting portion 33a press-fitting and fixing the contacting member 50 in cooperation with the bottom plate 32d when the contacting member 50 is inserted into the contacting member fixing portion 32 from the front. Further, a front end of the left side wall 32c is has a second press-fitting portion 33b press-fitting and fixing the contacting member 50 in cooperation with the bottom plate 32d when the contacting member 50 is inserted into the contacting member fixing portion 32 from the front. As shown in FIG. 2, a portion of the right side wall 32b located close to a back side thereof is formed with a notch 38 and a portion of the left side wall 32c located close to a back side thereof is also formed with a notch 38 (see FIG. 8). Then, as shown in FIG. 2 and FIG. 4, a first pressing portion 34a inclined inward from a front edge of the notch 38 of the right side wall 32b is provided. Further, similarly, a second pressing portion 34b inclined inward from a front edge of the notch 38 of the left side wall 32c is provided. The first pressing portion 34a and the second pressing portion 34b are bent inward, respectively, to press the contacting member 50 from the above after the contacting member 50 has been inserted into the contacting member fixing portion 32 from the front. Furthermore, as shown in FIG. 4 and FIG. 5, the first pressing portion 34a has a first restricting piece 35a extending downward, while the second pressing portion 34b has a second restricting piece 35b extending downward, as shown in FIG. 5. As shown in FIG. 4, the first restricting piece 35a enters a right-side side groove 56 described later formed in the contacting member 50 to restrict forward movement of the contacting member 50 when the first pressing portion 34a is bent inward. Further, the second restricting piece 35b enters a left-side side groove (not shown) formed in the contacting member 50 to restrict forward movement of the contacting member 50 when the second pressing portion 34b is bent inward.

Further, as shown in FIG. 2, the upper wall 32a of the contacting member fixing portion 32 is formed with a catching opening 36 caught to a housing lance 12 described later. Further, a pair of stabilizers 37 is provided at respective lower edges of the right side wall 32b and the left side wall 32c of the contacting member fixing portion 32 so as to project downward.

Next, the wire fixing portion 39 is composed of a crimping portion for crimping the wire W1 and it includes a core wire barrel 39a on a front side and an insulation barrel 39b on a back side. As shown in FIG. 5(B) and FIG. 8, the core wire barrel 39a is configured such that a bottom plate 39aa is continuous with the base plate portion 31a of the base portion 31. Further, as shown in FIG. 8, the insulation barrel 39*b* is configured such that a bottom plate 39*ba* is continuous with the bottom plate 39*aa* of the core wire barrel 39*a*.

Then, an insulation layer 40 is provided on an entire inner face including a portion with which the contacting member 50 contacts, an entire outer face, and an entire sheared face formed at a stamping time of a conductive metal plate of the contact main body 30. In FIG. 8, an aspect where the insulation layer 40 is provided on an upper face of the bottom plate 32*d* of the contacting member fixing portion 32 which is a portion with which the contacting member 50 contacts, an upper face of the base plate portion 31*a* of the base portion 31, an upper face of the bottom plate 39*aa* of the core wire barrel 39*a*, an upper face of the bottom plate 39*ba* of the insulation barrel 39*b*, a lower face of the bottom plate 32*d* of the contacting member fixing portion 32, a lower face of the base plate portion 31*a* of the base portion 31, a lower face of the bottom plate 39*aa* of the core wire barrel 39*a*, a lower face of the bottom plate 39*ba* of the insulation barrel 39*b*, and the sheared face is shown. Further, since the insulation layer 40 is also provided on the sheared face of the contact main body 30, the insulation layer 40 is provided on a portion of the contact main body 30 contacting with the core wire M1 of the core wire barrel 39*a*, in addition to the portion of the contact main body 30 contacting with the contacting member 50. It should be noted that the insulation layer 40 is formed by creating an oxide film on stainless steel forming a matrix of the contact main body 30. However, the insulation layer 40 may be formed by adhesion of a film, a tape or the like, by coating of fluorine-based resin, by coating treatment performed by electroless plating, or by coating treatment performed by CVD (chemical vapor deposition), if insulation can be achieved between the contact main body 30 and the contacting member 50.

Next, the contacting member 50 has a fixing portion 51 fixed to the contacting member fixing portion 32, an extension portion 52 extending backward from a back end of the fixing portion 51 up to the core wire barrel 39*a* of the wire fixing portion 39, and a tab-like contacting portion 53 extending forward from a front end of the fixing portion 51. The contacting member 50 is formed by stamping a metal plate made of a metal material for a thermocouple (for example, chromel) of the same kind as the core wire M1. Since a material of the contacting member 50 is the metal material for a thermocouple of the same kind as the core wire M1, it is a metal material of a different kind from the metal material of the contact main body 30.

The fixing portion 51 of the contacting member 50 is formed in an approximately rectangular plate-like shape extending slender in the front/back direction and having a width in a left/right direction where the fixing portion 51 can be inserted between the right side wall 32*b* and the left side wall 32*c* of the contacting member fixing portion 32. Then, as shown in FIG. 2, a pair of stoppers 54*a* and 54*b* is provided at a front end of the fixing portion 51 so as to project in the left direction and the right direction from the left side edge and the right side edge of the fixing portion 51, respectively. The right-side stopper 54*a* enters an opening formed on a lower side of the first press-fitting portion 33*a* of the contacting member fixing portion 32 to abut on the right side wall 32*b* when the contacting member 50 is inserted into the contacting member fixing portion 32 from the front, thereby restricting advance of the contacting member 50. Further, the left-side stopper 54*b* enters an opening formed on a lower side of the second press-fitting portion 33*b* of the contacting member fixing portion 32 to abut on the left side wall 32*c* when the contacting member 50 is inserted into the contacting member fixing portion 32 from the front, thereby restricting advance of the contacting member 50. The first press-fitting portion 33*a* of the contacting member fixing portion 32 press-fits and fixes the right-side stopper 54*a* in cooperation with the bottom plate 32*d*, while the second press-fitting portion 33*b* press-fits and fixes the left-side stopper 54*b* in cooperation with the bottom plate 32*d*. Further, as shown in FIG. 2, a pair of side grooves 56 (only the right-side side groove 56 is shown in FIG. 2) is formed on the left side edge and the right side edge of a rear portion of the fixing portion 51. As described above, the first restricting piece 35*a* enters the right-side side groove 56, while the second restricting piece 35*b* enters the left-side side groove, thereby restricting forward movement of the contacting member 50.

It should be noted that regarding projecting amounts of the right-side stopper 54*a* and the left-side stopper 54*b* from the left side edge and the right side edge of the fixing portion 51, the projecting amount of the left-side stopper 54*b* is larger than that of the right-side stopper 54*a*, as shown in FIG. 2. The left-side stopper 54*b* further projects beyond the left side wall 32*c* in the left direction to constitute a keying portion 55.

Further, the extension portion 52 of the contacting member 50 extends backward from a rear end of the fixing portion 51 to be formed in an approximately rectangular shape extending slender in the front/back direction and having a width in the left/right direction where the extension portion 52 can be inserted between the right side wall 31*b* and the left side wall 31*c* of the base portion 31 and into the core wire barrel 39*a*.

Furthermore, the contacting portion 53 of the contacting member 50 has a tab-like shape extending forward from a front end of the fixing portion 51 and it projects from the contacting member fixing portion 32 when the contacting member 50 is fixed to the contacting member fixing portion 32. The contacting portion 53 is received by a third contact 120 (see FIG. 13) configured in a female shape to contact therewith.

Next, an assembling method of the first contact 20 will be explained.

In assembling of the first contact 20, the contacting member 50 is inserted into the contacting member fixing portion 32 of the contact main body 30, while being led by the extension portion 52 side of the contacting member 50. In this inserting, the right-side stopper 54*a* of the contacting member 50 is put into the opening formed in the lower side of the first press-fitting portion 33*a* of the contacting member fixing portion 32 to be caused to abut on the right side wall 32*b*. Further, the left-side stopper 54*b* of the contacting member 50 is put into the opening formed in the lower side of the second press-fitting portion 33*b* of the contacting member fixing portion 32 to be caused to abut on the left side wall 32*c*. Thereby, insertion of the contacting member 50 (backward movement) is restricted. At this time, the extension portion 52 of the contacting member 50 extends on an upper side of the bottom plate 39*aa* of the core wire barrel 39*a* of the contact main body 30 and on the base plate portion 31*a* of the base portion 31 and the fixing portion 51 extends on the bottom plate 32*d* of the contacting member fixing portion 32. Further, the contact portion 53 projects forward from the contacting member fixing portion 32 of the contact main body 30. Here, the first press-fitting portion 33*a* of the contacting member fixing portion 32 press-fits and fixes the right-side stopper 54*a* in cooperation with the bottom plate 32*d*, while the second press-fitting portion 33*b* press-fits and fixes the left-side stopper 54*b* in cooperation with the bottom plate 32*d*. Thereby, vertical movement of the contacting member 50 is restricted.

Next, the first pressing portion 34*a* and the second pressing portion 34*b* formed on the contacting member fixing portion 32 are bent inward, respectively, to press the fixing portion 51 of the contacting member 50 from the above. Furthermore, at this time, the first restricting piece 35*a* and the second restricting piece 35*b* are put into the right-side side groove 56 and the left-side side groove formed in the fixing portion 51, respectively. The first pressing portion 34*a* and the second pressing portion 34*b* press the fixing portion 51 of the contacting member 50 from the above, so that vertical movement of the contacting member 50 is restricted in cooperation with the bottom plate 32*d*. Further, the first restricting piece 35*a* and the second restricting piece 35*b* are put into the right-side side groove 56 and the left-side side groove formed in the fixing portion 51, respectively, so that forward movement of the contacting member 50 is restricted.

Next, after assembling of the first contact 20 is completed, as shown in FIG. 4 and FIGS. 5(B) and 5(C), the core wire M1 of the wire W1 is on the extension portion 52 of the contacting member 50 and an insulation coating I1 of the wire W1 is within the insulation barrel 39*b*.

Then, as shown in FIG. 2 and FIG. 6 to FIG. 9, the core wire M1 of the wire W1 is crimped by the core wire barrel 39*a* and the insulation coating I1 of the wire W1 is crimped by the insulation barrel 39*b*. Thereby, the wire W1 is connected to the contact main body 30 in a state where the core wire M1 of the wire W1 has been electrically connected to the extension portion 52 of the contacting member 50.

Here, since the insulation layer 40 is on the portion of the contact main body 30 contacting with the contacting member 50, the contacting member 50 and the contact main body 30 can be insulated from each other. Therefore, since a plurality of current paths joining together does not occur, an electromotive force can be measured with a high accuracy.

Further, the insulation layer 40 is also on the portion of the wire fixing portion 39 (the core wire barrel 39*a*) contacting with the core wire M1 of the wire W1 in addition to the portion of the contact main body 30 contacting with the contacting member 50. Therefore, the contact main body 30 and the core wire M1 of the wire W1 can be insulated from each other.

Further, the core wire M1 of the wire W1 and the contacting member 50 are made of a metal material for a thermocouple (for example, chromel) of the same kind and the contact main body 30 and the contacting member 50 are made of metal materials of different kinds from each other. In this case, if the contact main body 30, the contacting member 50, and the core wire M1 are conducting to one another, an electromotive force occurs between the contact main body 30, the contacting member 50, and the core wire M1, which results lowering of measurement reliability in the case of use as a thermocouple. In this embodiment, however, the insulation layer 40 is on the portion of the contact main body 30 contacting with the contacting member 50, so that the contacting member 50 and the contact main body 30 are insulated from each other. Further, the insulation layer 40 is also provided on the portion of the wire fixing portion 39 (the core wire barrel 39*a*) contacting with the core wire M1 of the wire W1 in addition to the portion of the contact main body 30 contacting with the contacting member 50 so that the contact main body 30 and the core wire M1 of the wire W1 are insulated from each other. Therefore, since an electromotive force does not occur between the contact main body 30, the contacting member 50, and the core wire M1, the first contact 20 of this embodiment can be favorably used as a contact for a thermocouple.

Figure 10:
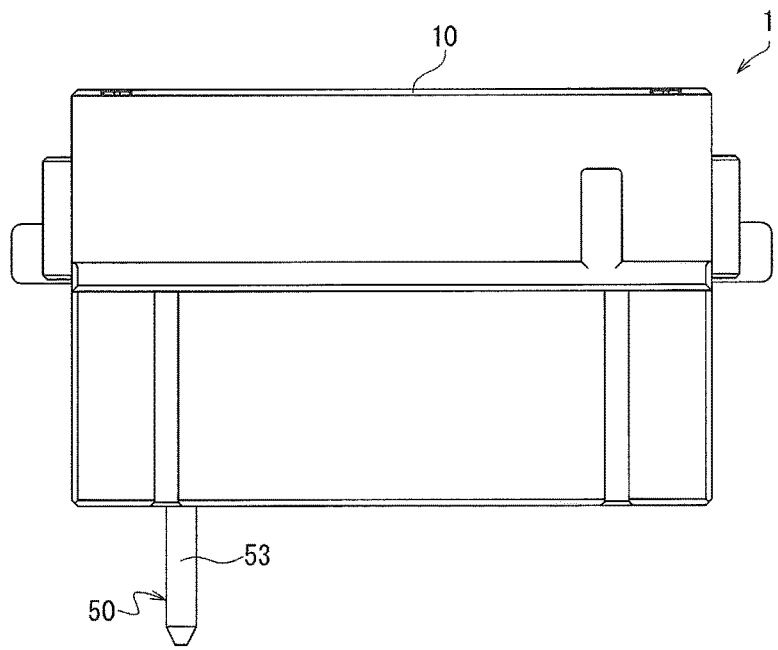
FIG. 10(A) is a top view showing the first connector which has received the first contact and the second contact shown in FIG. 1 in a housing.
FIG. 10(B) is front view showing the first connector which has received the first contact and the second contact shown in FIG. 1 in a housing.
Figure 10:
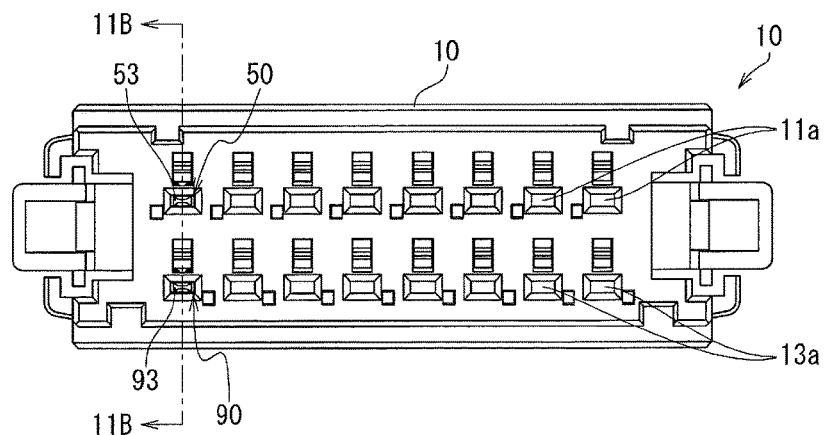
Figure 11A:
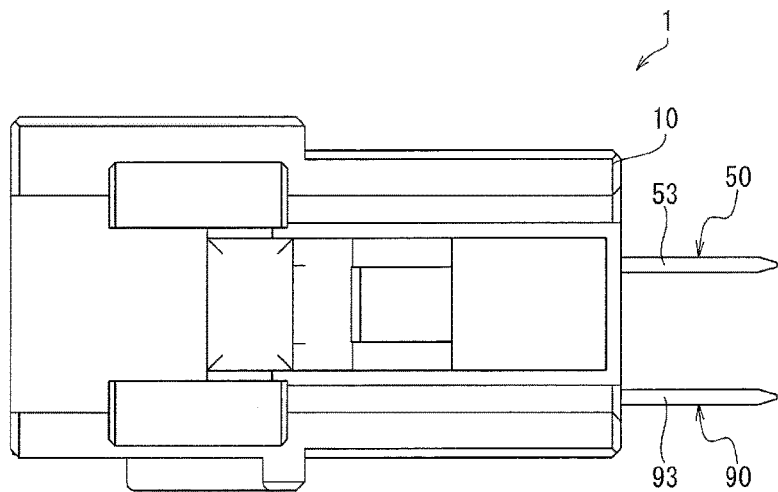
FIG. 11(A) is a left side view of the first connector shown in FIG. 10.
Figure 11:
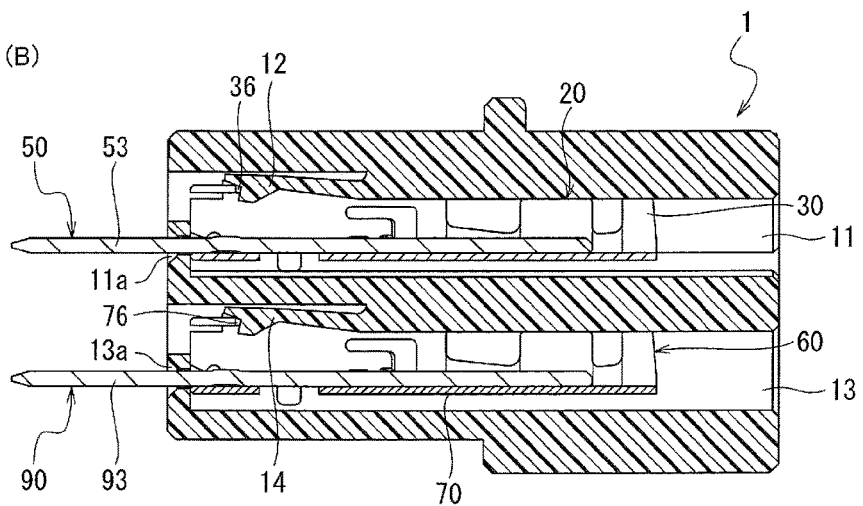
FIG. 11(B) is a cross-sectional view taken along line 11B-11B in FIG. 10(B).
Figure 12:
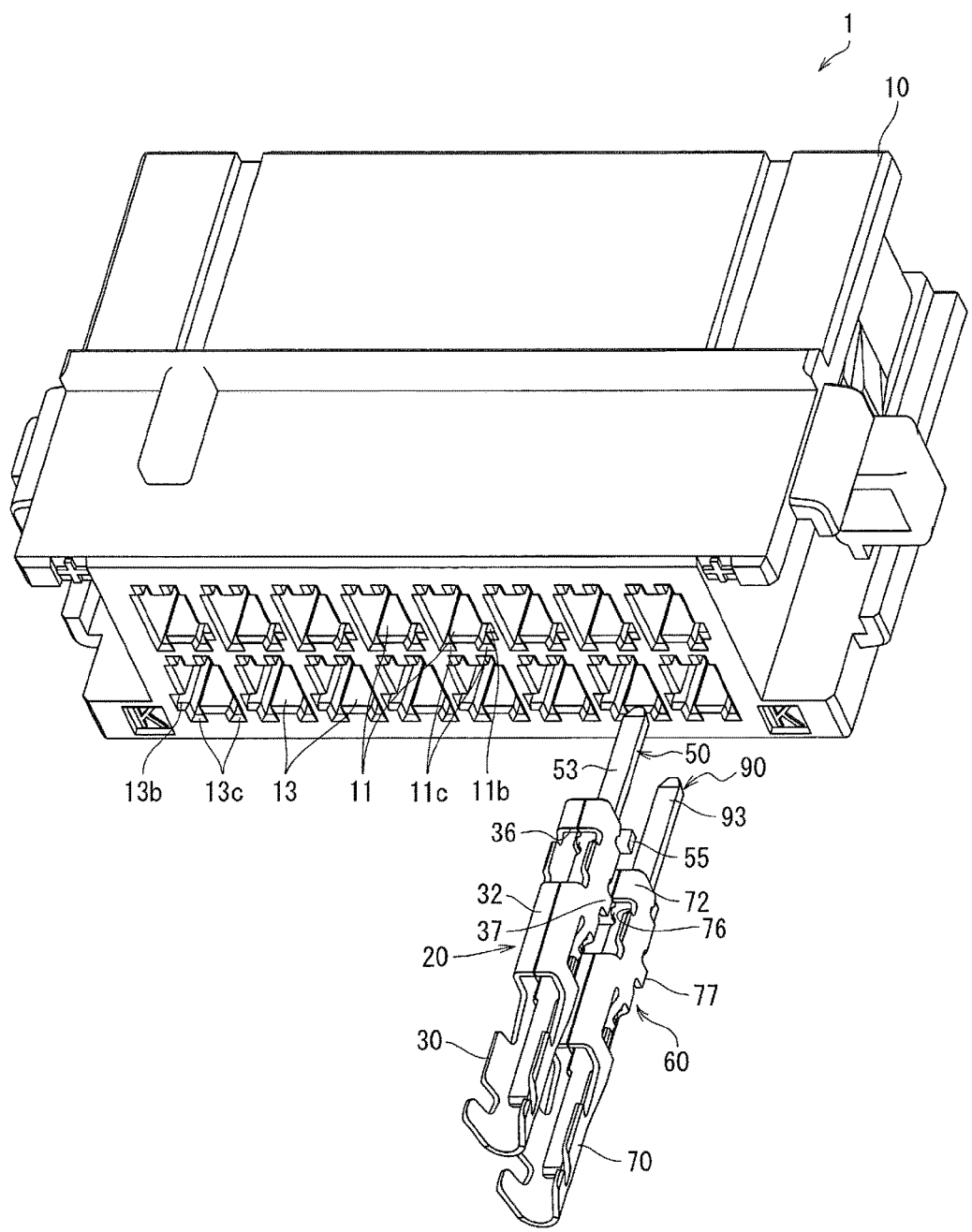
FIG. 12 is an exploded perspective view from a back face side of the first connector in FIG. 10.

The first contact 20 assembled in the above manner is received in the housing 10 of the first connector 1, as shown in FIG. 10 to FIG. 12.

Here, the housing 10 has an approximately rectangular parallelepiped shape extending in the front/back direction, in the left/right direction and in the vertical direction and it is formed by molding insulating synthetic resin. As shown in FIG. 11 and FIG. 12, the housing 10 has a plurality of first contact receiving cavities 11 and a plurality of second contact receiving cavities 13 extending forward from a back face of the housing 10. As shown in FIG. 12, the plurality of first contact receiving cavities 11 are in an upper-side portion of the housing 10 along the left/right direction in one line at a predetermined pitch. Further, the plurality of second contact receiving cavities 13 are in a portion of the housing 10 located below the first contact receiving cavities 11 along the left/right direction in one line at a predetermined pitch.

Then, as shown in FIG. 10(B) and FIG. 11(B), a front end of each first contact receiving cavity 11 has an opening 11*a* for deriving the contacting portion 53 of the first contact 20. Further, similarly, a front end of each second contact receiving cavity 13 has with an opening 13*a* for deriving a contacting portion 93 described later of the second contact 60.

Further, as shown in FIG. 12, a back end of each first contact receiving cavity 11 has a keying recessed portion 11*b* for receiving the keying portion 55 of each first contact 20. The keying recessed portion 11*b* is at a left-edge lower end portion of a contact insertion-side opening of the first contact receiving cavity 11 formed in a rectangular shape so as to be recessed leftward. Further, as shown in FIG. 12, a pair of stabilizer recessed portions 11*c* for receiving the stabilizer 37 of each first contact 20 is forward from a back end of each first contact receiving cavity 11. The pair of stabilizer recessed portion 11*c* is formed so as to be recessed downward from both left and right ends of a lower face of the contact insertion-side opening of the first contact receiving cavity 11 in the rectangular shape.

Further, as shown in FIG. 12, a back end of each second contact receiving cavity 13 has a keying recessed portion 13*b* for receiving a keying portion (not shown) described later of each second contact 60. The keying recessed portion 13*b* is formed at a right-edge lower end portion of the contact insertion-side opening of the second contact receiving cavity 13 formed in a rectangular shape so as to be recessed rightward. Further, as shown in FIG. 12, a pair of stabilizer recessed portions 13*c* for receiving a stabilizer 77 described later of each second contact 60 is forward from a back end of each second contact receiving cavity 13. The pair of stabilizer recessed portions 13*c* are formed so as to be recessed downward at both left and right ends of a lower face of the contact insertion-side opening of the second contact receiving cavity 13 formed in the rectangular shape.

Further, as shown in FIG. 11(B), each first contact receiving cavity 11 has the housing lance 12 catching the catching opening 36 of the first contact 20. Further, each second contact receiving cavity 13 also has a housing lance 14 catching a catching opening 76 described later of the second contact 60.

Here, the second contact 60 has a basic configuration similar to that of the first contact 20, but a position of a keying portion (not shown) thereof is different from that of the keying portion 55 of the first contact 20. Furthermore, a material of a contacting member 90 in the second contact 60 is different from that of the contacting member 50 of the first contact 20.

That is to say, the keying portion 55 of the first contact 20 further has leftward projection of the left-side stopper 54b of the contacting member 50 beyond the left side wall 32c. On the other hand, the keying portion of the second contact 60 further has rightward projection of the right-side stopper (not shown) of the contacting member 90 beyond the right side wall contrary to the keying portion 55 of the first contact 20. A material of the contacting member 90 in the second contact 60 is a metal material for a thermocouple (for example, alumel) of the same kind as the core wire M2 made of a metal material for a thermocouple. Therefore, the material of the contacting member 90 is different from the material of the contacting member 50 made of the metal material for a thermocouple (for example, chromel) of the same kind as the core wire M1.

Then, the wire fixing portion of the contact main body 70 of the second contact 60 is connected with the wire W2 having the core wire M2, and the core wire M2 is connected to the extension portion of the contacting member 90.

It should be noted that, in FIG. 10 to FIG. 12, reference sign 72 denotes a contacting member fixing portion in the second contact 60, reference sign 76 denotes the catching opening in the second contact 60, reference sign 77 denotes the stabilizer in the second contact 60, reference sign 90 denotes the contacting member in the second contact 60, and reference sign 93 denotes a tab-like contacting portion in the second contact 60.

Then, as shown in FIG. 11(B) and FIG. 12, each first contact 20 is inserted from the back of the housing 10 into each first contact receiving cavity 11 while being led by the contact portion 53. When each first contact 20 is inserted into each first contact receiving cavity 11, the housing lance 12 is caught to the catching opening 36, so that retaining of each first contact 20 is achieved. When each first contact 20 is inserted into each first contact receiving cavity 11, the stabilizer 37 of each first contact 20 is received in the stabilizer recessed portion 11c, so that an attitude of each first contact 20 is controlled.

Further, when each first contact 20 is inserted into each first contact receiving cavity 11, the keying portion 55 is received in the keying recessed portion 11b. At this time, when the first contact 20 is caused to be inserted into the second contact receiving cavity 13 erroneously, the keying portion 55 of the first contact 20 abuts on a back face of the housing 10. Therefore, insertion of the first contact 20 into the second contact receiving cavity 13 is blocked. This is because the keying recessed portion 13b for receiving the keying portion of the second contact 60 is at the right-edge lower end portion of the contact insertion-side opening of the second contact receiving cavity 13 contrary to the keying recessed portion 11b for receiving the keying portion 55.

Then, as shown in FIG. 11(B) and FIG. 12, each second contact 60 is inserted from the back of the housing 10 into each second contact receiving cavity 13 while being led by the contact portion 93. When each second contact 60 is inserted into each second contact receiving cavity 13, the housing lance 14 is caught to the catching opening 76, so that retaining of each second contact 60 is achieved. When each second contact 60 is inserted into each second contact receiving cavity 13, the stabilizer 77 of each second contact 60 is received in the stabilizer recessed portion 13c, so that an attitude of each second contact 60 is controlled.

Further, when each second contact 60 is inserted into each second contact receiving cavity 13, the keying portion (not shown) is received in the keying recessed portion 13b. At this time, when the second contact 60 is caused to be inserted into the first contact receiving cavity 11 erroneously, the keying portion of the second contact 60 abuts on the back face of the housing 10. Therefore, insertion of the second contact 60 into the first contact receiving cavity 11 is blocked. The keying recessed portion 11b for receiving the keying portion 55 of the first contact 20 is formed at the left-edge lower end portion of the contact insertion-side opening of the first contact receiving cavity 11 contrary to the keying recessed portion 13b for receiving the keying portion of the second contact 60.

Next, regarding the second connector 101 to be mated with the first contact 1, the third contact 120 for contacting with the first contact 20 will be explained with reference to FIG. 13 to FIG. 16.

Figure 13:
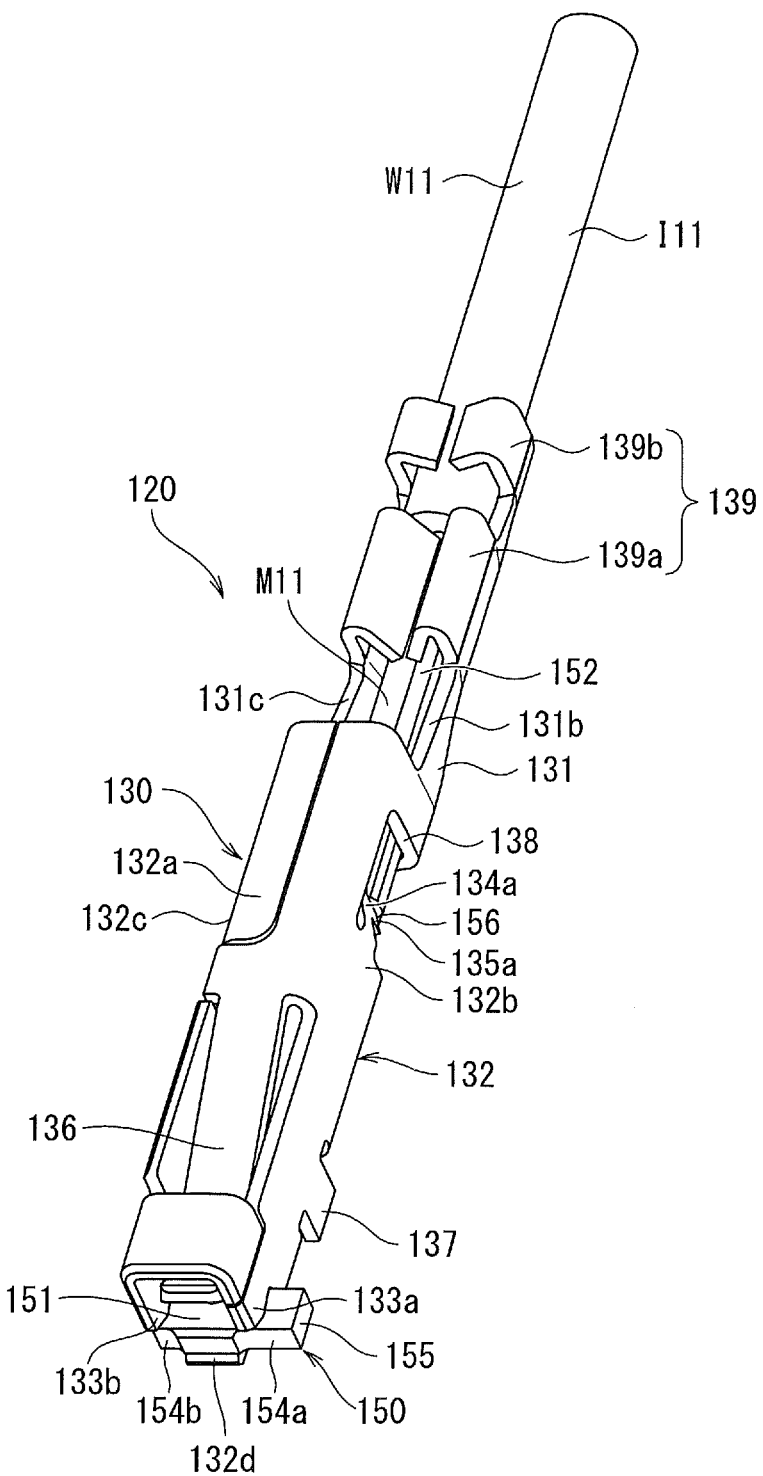
FIG. 13 is a perspective view of a state where a wire has been connected to the third contact used in the second connector shown in FIG. 1.

The third contact 120 is one of a female type receiving the tab-like contact portion 53 of the first contact 20 to contact therewith and it is provided with a contact main body 130 and a contacting member 150 formed separately from the contact main body 130, as shown in FIG. 13.

As shown in FIG. 13, the contact main body 130 has a base portion 131, a contacting member fixing portion 132 arranged on a front side of the base portion 131, and a wire fixing portion 139 on a back side of the base portion 131. The contact main body 130 is formed by stamping and forming a conductive metal plate (for example, a stainless steel plate) made of a metal material of a different kind from that of the core wire M11.

Here, as shown in FIG. 13 to FIG. 16, the base portion 131 has a flat plate-like base plate portion 131a extending in the front/back direction and in the left/right direction, a right side wall 131b upstanding from a right edge of the base plate portion 131a, and a left side wall 131c upstanding from a left edge of the base plate portion 131a.

Further, the contacting member fixing portion 132 is an approximately box-like shape in which the contacting member 150 and the contacting portion 53 of the first contact 20 can be inserted from the front and it is provided with an upper wall 132a, a right side wall 132b, a left side wall 132c, and a bottom plate 132d. The bottom plate 132d extends forward in an approximately rectangular plate-like shape from the base plate portion 131a of the base portion 131. Further, the right side wall 132b extends upward in an approximately rectangular plate-like shape from a right edge of the bottom plate 132d. Further, the left side wall 132c extends upward in an approximately rectangular plate-like shape from a left edge of the bottom plate 132d. In addition, the upper wall 132a has portions extending inward from the right side wall 132b and the left side wall 132c, respectively, to join together at a central portion in the left/right direction, and the portion extending from the right side wall 132b is located at a front side of the left side wall 132c to extend up to the left side wall 132c.

Further, the upper wall 132a has an elastic contacting piece 136 extending obliquely downward toward the fixing portion 151 of the contacting member 150 inserted into the contacting member fixing portion 132. When the first contact 20 is mated with the third contact 120, the contacting portion 53 of the first contact 20 is received between the fixing portion 151 of the contacting member 150 and the elastic contacting piece 136 to contact with the fixing portion 151.

Then, as shown in FIG. 13, a front end of the right side wall 132b of the contacting member fixing portion 132 has a first press-fitting portion 133a press-fitting and fixing the contacting member 150 in cooperation with the bottom plate 132d when the contacting member 150 is inserted into the contacting member fixing portion 132 from the front. Further, a front end of the left side wall 132c has a second press-fitting portion 133b press-fitting and fixing the contacting member 150 in cooperation with the bottom plate 132d when the contacting member 150 is inserted into the contacting member fixing portion 132 from the front.

Figure 15:
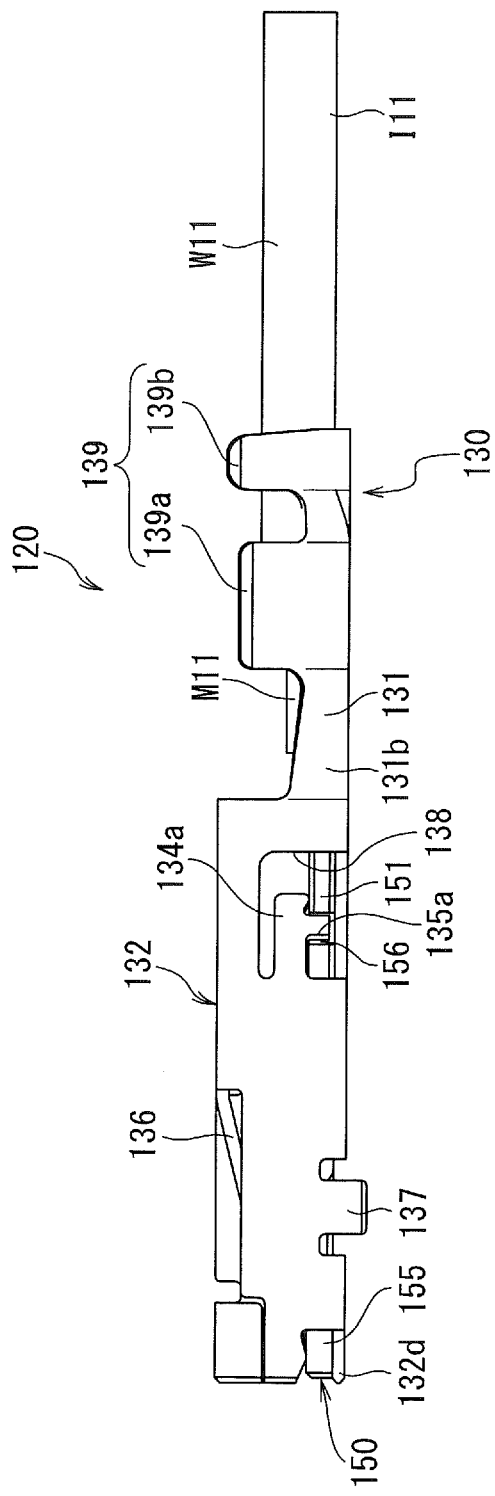
FIG. 15 a right side view of the third contact used in the second connector shown in FIG. 1 before the wire is connected together with the third contact.
Figure 16:
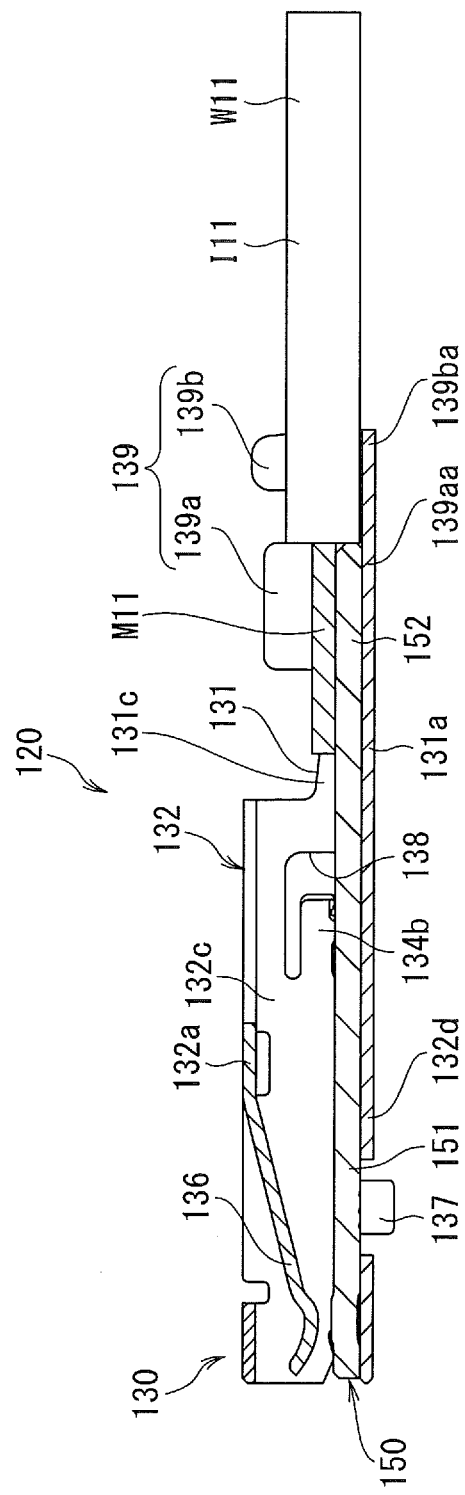
FIG. 16 is a cross-sectional view taken along line 16-16 in FIG. 14.
Figure 17:
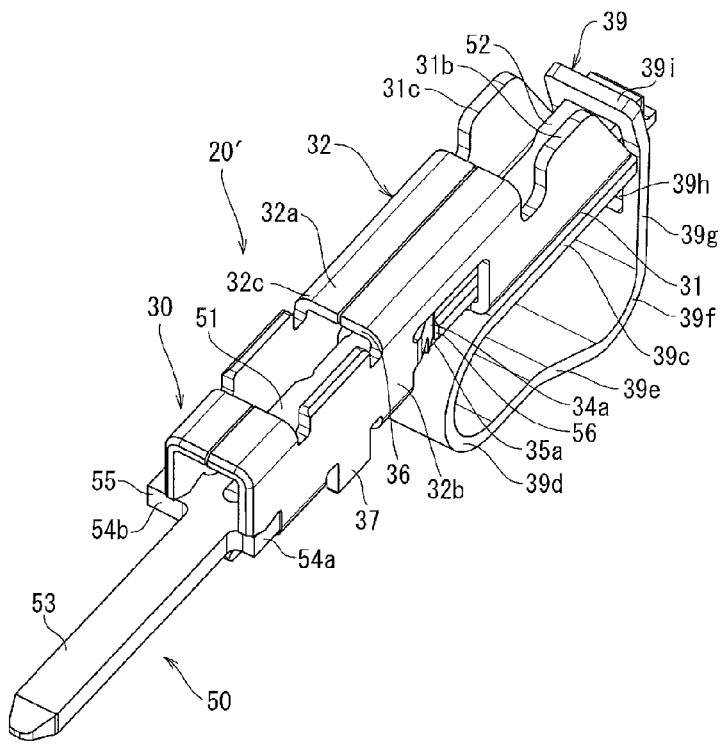
FIG. 17(A) is a perspective view of the modified embodiment of the first contact which has been cut in a front/back direction
FIG. 17(B) is a cross-sectional view of the modified embodiment of the first contact which has been cut in a front/back direction.
Figure 17:
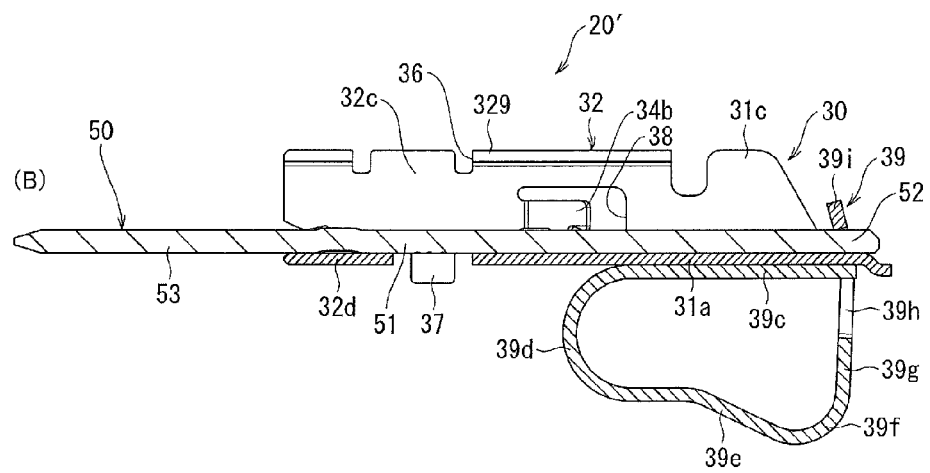
Figure 18:
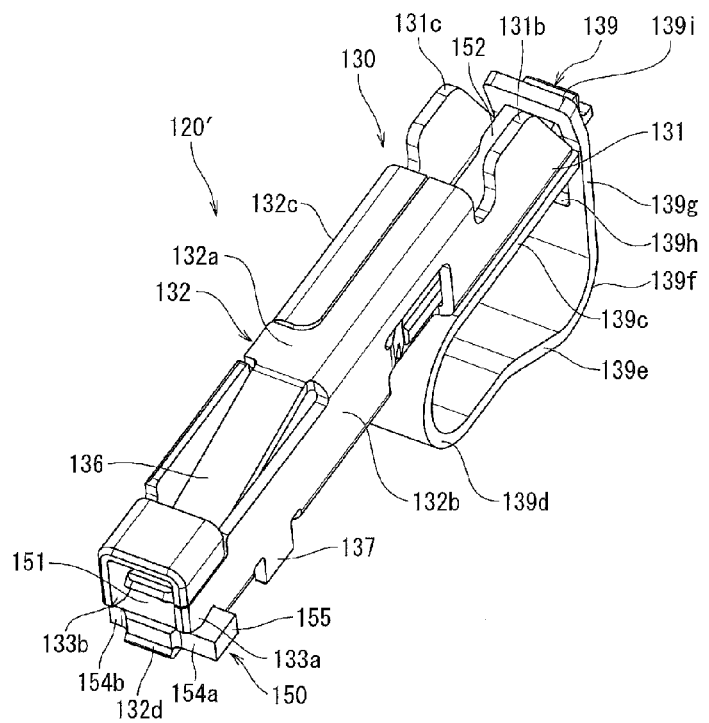
FIG. 18 shows a modified embodiment of the third contact.
Figure 18:
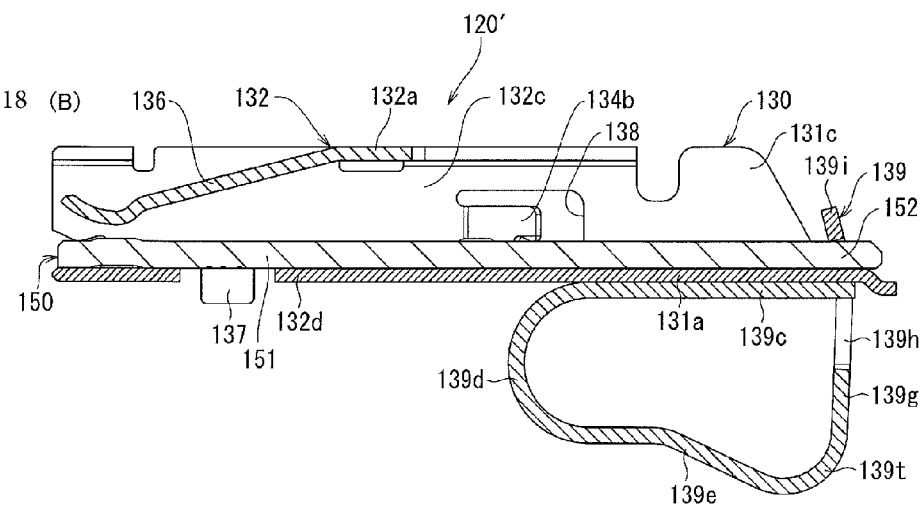

Further, as shown in FIG. 13, a portion of the contacting member fixing portion 132 located close to the back of the right side wall 132b has a notch 138, while a portion of the contacting member fixing portion 132 located close to the left side wall 132c also has a notch 138, as shown in FIG. 16. Then, as shown in FIG. 13 and FIG. 15, a first pressing portion 134a inclined inward from a front edge of the notch 138 of the right side wall 132b is provided. Further, similarly, as shown in FIG. 16, a second pressing portion 134b inclined inward from a front edge of the notch of the left side wall 132c is provided.

After the contacting member 150 is inserted into the contacting member fixing portion 32, the first pressing portion 134a and the second pressing portion 134b are bent inward, respectively, to press the contacting member 150 from the above. Further, as shown in FIG. 15, the first pressing portion 134a has a first restricting piece 135a extending downward, while the second pressing portion 134b has a second restricting piece (not shown) extending downward. As shown in FIG. 13 and FIG. 15, when the first pressing portion 134a is bent inward, the first restricting piece 135a enters a right-side side groove 156 described later formed in the contacting member 150 to restrict forward movement of the contacting member 150. Further, when the second pressing portion 134b is bent inward, the second restricting piece enters a left-side side groove (not shown) formed in the contacting member 150 to restrict forward movement of the contacting member 150.

Further, a pair of stabilizers 137 is at respective lower edges of the right side wall 132b and the left side wall 132c of the contacting member fixing portion 132 so as to project downward.

Next, the wire fixing portion 139 is composed of a crimping portion for crimping the wire W1 like the wire fixing portion 39 of the first contact 20, and it is composed of a core wire barrel 139a on a front side and an insulation barrel 139b arranged on a back side. As shown in FIG. 16, the core wire barrel 139a is configured such that a bottom plate 139aa is continuous with the base plate portion 131a of the base portion 131. Further, the insulation barrel 139b is configured such that a bottom plate 139ba is continuous with the bottom plate 139aa of the core wire barrel 139a.

Then, an insulation layer (not shown) is provided on an entire inner face including a portion of the contact main body 130 contacting with the contacting member 150, an entire outer face and an entire sheared face formed at a stamping time of a conducting metal plate like the contact main body 30 of the first contact 20. Since the insulation layer is provided on a sheared face of the contact main body 130, the insulation layer is also provided at a portion of the core wire barrel 139a contacting with the core wire M11 in addition to a portion of the contact main body 130 contacting with the contacting member 150. Further, since the insulation layer is on the entire inner face of the contact main body 130 including a portion contacting with the contacting member 150, an insulation layer is also on a face of the elastic contacting piece 136 contacting with the fixing portion 151. It should be noted that the insulation layer is one obtained by creating an oxide film on stainless steel forming a matrix of the contact main body 130 like the insulation layer 40 provided on the contact main body 30 of the first contact 20. However, the insulation layer may be an adhesion of a film, a tape or the like, by coating of fluorine-based resin, by coating treatment performed by electroless plating, or by coating treatment performed by CVD, if insulation can be achieved between the contact main body 130 and the contacting member 150.

Next, the contacting member 150 has a fixing portion 151 fixed to the contacting member fixing portion 132, and an extension portion 152 extending backward from a back end of the fixing portion 151 up to the core wire barrel 139a of the wire fixing portion 139. The contacting member 150 is formed by stamping a metal plate made of a metal material for a thermocouple (for example, chromel) of the same kind as the core wire M11. Since the material of the contacting member 150 is a metal material for a thermocouple of the same kind as that of the core wire M11, it is a metal material of a different kind from the metal material of the contact main body 130.

The fixing portion 151 of the contacting member 150 is in an approximately rectangular plate-like shape extending slender in the front/back direction and having a left-right width where the fixing portion 151 can be inserted between the right side wall 132b and the left side wall 132c of the contacting member fixing portion 132. Then, as shown in FIG. 13, a front end of the fixing portion 151 has a pair of stoppers 154a and 154b projecting in a left direction and in a right direction from the left side edge and the right side edge of the fixing portion 151. When the contacting member 150 is inserted into the contacting member fixing portion 132, the right-side stopper 154a enters an opening formed on a lower side of the first press-fitting portion 133a of the contacting member fixing portion 132 to abut on the right side wall 132b, thereby restricting advance of the contacting member 150. Further, when the contacting member 150 is inserted into the contacting member fixing portion 132 from the front, the left-side stopper 154b enters an opening on a lower side of the second press-fitting portion 133b of the contacting member fixing portion 132 to abut on the left side wall 132c, thereby restricting advance of the contacting member 150. The first press-fitting portion 133a of the contacting member fixing portion 132 press-fits and fixes the right-side stopper 154a in cooperation with the bottom plate 132d, while the second press-fitting portion 133b press-fits and fixes the left-side stopper 154b in cooperation with the bottom wall 132d. Further, as shown in FIG. 13, a pair of side grooves 156 (only a right-side side groove 156 is shown in FIG. 13) is in a left side edge and a right side edge of a back portion of the fixing portion 151. As described above, the first restricting piece 135a enters the right-side side groove 156, while the second restricting piece 135b enters the left-side side groove, thereby restricting forward movement of the contacting member 150.

It should be noted that regarding projecting amounts of the right-side stopper 154a and the left-side stopper 154b from the left side edge and the right side edge of the fixing portion 151, the projecting amount of the right-side stopper 154a is larger than that of the left-side stopper 154b, as shown in FIG. 13. The right-side stopper 154a further projects beyond the right side wall 132b in the right direction to constitute the keying portion 155.

Further, the extension portion 152 of the contacting member 150 extends backward from a back end of the fixing portion 151 and it is in an approximately rectangular plate shape extending slender in the front/back direction and having a left-right width where the extension portion 152 can be inserted between the right side wall 131b and the left side wall 131c of the base portion 131 and into the core wire barrel 139a.

In assembling of the third contact 120 thus configured, the contacting member 150 is inserted into the contacting member fixing portion 132 of the contact main body 130 while being led by the extension portion 152 side thereof. When this insertion is performed, the right-side stopper 154a of the contacting member 150 is put into an opening on a lower side of the first press-fitting portion 133a of the contacting member fixing portion 132 to be caused to abut on the right side wall 132b. Further, the left-side stopper 154b of the contacting member 150 is put into an opening on a lower side of the second press-fitting portion 133b of the contacting member fixing portion 132 to be caused to abut on the left side wall 132c. Thereby, insertion (backward movement) of the contacting member 150 is restricted. At this time, the extension portion 152 of the contacting member 150 extends on an upper side of the bottom plate 139aa of the core wire barrel 139a and on the base plate portion 131a of the base plate 131 and the fixing portion 151 extends on the bottom plate 132d of the contacting member fixing portion 132. Here, the first press-fitting portion 133a of the contacting member fixing portion 132 press-fits and fixes the right-side stopper 154a in cooperation with the bottom plate 132d, while the second press-fitting portion 133b press-fits and fixes the left-side stopper 154b in cooperation with the bottom plate 132d. Thereby, vertical movement of the contacting member 150 is restricted.

Next, the first pressing portion 134a and the second pressing portion 134b on the contacting member fixing portion 132 are bent inward, respectively, to press the fixing portion 151 of the contacting member 150 from the above. Further, at this time, the first restricting piece 135a and the second restricting piece 135b are put into the right-side groove 156 and the left-side groove formed in the fixing portion 151, respectively.

Figure 14:
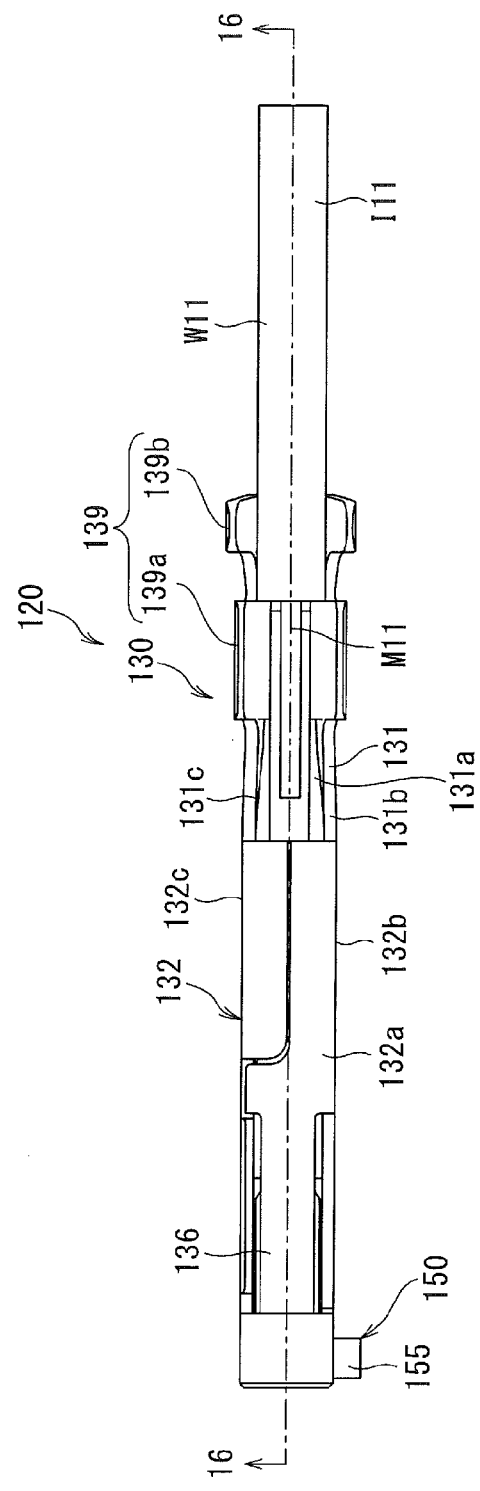
FIG. 14 is a top view of the third contact used in the second connector shown in FIG. 1 before the wire is connected together with the third contact.

Next, after assembling of the third contact 120 is completed, as shown in FIG. 14 to FIG. 16, the core wire M11 of the wire W11 is on the extension portion 152 of the contacting member 150, and the insulation coating I11 of the wire WII is in the insulation barrel 139b.

Then, as shown in FIG. 13, the core wire M11 of the wire W11 is crimped by the core wire barrel 139a, and the insulation coating I11 of the wire W11 is crimped by the insulation barrel 139b. Thereby, the wire W11 is connected to the contact main body 130 in a state where the core wire M11 of the wire W11 has been electrically connected to the extension portion 152 of the contacting member 150.

Here, since the portion of the contact main body 130 contacting with the contacting member 150 has the insulation layer (not shown), the contacting member 150 and the contact main body 130 can be insulated from each other. Therefore, since the current paths joining together do not occur, an electromotive force can be measured with a high accuracy.

Further, the insulation layer is also on a portion of the wire fixing portion 139 (the core wire barrel 139a) contacting with the core wire M11 of the wire W11 in addition to the portion of the contact main body 130 contacting with the contacting member 150. Therefore, the contact main body 130 and the core wire M11 of the wire W11 can be insulated from each other.

Further, the core wire M11 of the wire W11 and the contacting member 150 are made of metal materials for a thermocouple (for example, chromel) of the same kind, and the contact main body 130 and the contacting member 150 are made of metal materials of different kinds. In this case, if the contact main body 130, the contacting member 150, and the core wire M1 are conducting to each other, an electromotive force occurs between the contact main body 130, the contacting member 150, and the core wire M11, which results in lowering of measurement reliability in use as a thermocouple. In this embodiment, however, the insulation layer is on the portion of the contact main body 130 contacting with the contacting member 150, so that the contacting member 150 and the contact main body 130 are insulated from each other. Further, the insulation layer is also on the portion of the wire fixing portion 139 (the core wire barrel 139a) contacting with the core wire M11 of the wire W11 in addition to the portion of the contact main body 130 contacting with the contacting member 150, so that contact main body 130 and the core wire M11 of the wire W11 are insulated from each other. Therefore, since an electromotive force does not occur between the contact main body 130, the contacting member 150, and the core wire M11, the third contact 120 of this embodiment can be favorably used as a contact for a thermocouple.

Then, the third contact 120 is received in the third contact receiving cavity (not shown) of the housing 110 of the second connector 101.

It should be noted that the fourth contact 160 is received in the fourth contact receiving cavity (not shown) of the housing 110 of the second connector 101, but a basic structure of the fourth contact 160 is similar to that of the third contact. However, a position of a keying portion (not shown) of the fourth contact 160 is different from that of the keying portion 155 of the third contact 120.

Therefore, erroneous insertion of the third contact 120 into the fourth contact receiving cavity and erroneous insertion of the fourth contact 160 into the third contact receiving cavity are blocked.

Further, a material of the contacting member in the fourth contact 160 is a metal material for a thermocouple of the same kind as that the core wire M12 and it is different from that of the contacting member 150 in the third contact 120 which is the metal material for a thermocouple of the core wire M11.

Then, when the first connector 1 which has received the first contact 20 and the second contact 60, and the second connector 101 which has received the third contact 120 and the fourth contact 160 are caused to match with each other, the first contact 20 and the third contact 120 are electrically connected to each other, while the second contact 60 and the fourth contact 160 are electrically connected to each other. Thereby, the core wire M1 of the wire W1, the contacting member 50 of the first contact 20, the contacting member 150 of the third contact 120, and the core wire M11 of the wire W11 are electrically connected to one another from the joining point A toward the data logger 300. Further, the core wire M2 of the wire W2, the contacting member 90 of the second contact 60, the contacting member (not shown) of the fourth contact 160, and the core wire M12 of the wire W12 are electrically connected to one another from the joining point A to the data logger 300.

At this time, in the contact main body 30 of the first contact 20, the contacting member 50, and the core wire M1 are insulated from one another. Similarly, the contact main body 130 of the third contact 120, the contacting member 150, and the core wire M11 are insulated from one another. Further, the contact main body 70 of the second contact 60, the contacting member 90, and the core wire M2 are insulated from one another. Similarly, the contact main body (not shown) of the fourth contact 160, the contacting member (not shown), and the core wire M12 are insulated from one another.

Therefore, in the temperature measurement apparatus S, the data logger 300 can detect a temperature within the chamber 200 with a high accuracy in response to an electromotive force generated at the joining point A.

Next, a modified embodiment of the first contact 20 will be explained with reference to FIGS. 17(A) and 17(B). In FIGS. 17(A) and 17(B), same members as those shown in FIG. 2 to FIG. 9 are denoted with same reference signs and explanation thereof may be omitted.

A basic configuration of a first contact 20' shown in FIGS. 17(A) and 17(B) is the same as that of the first contact 20 shown in FIG. 2 to FIG. 9, but the former is different in configuration of the wire fixing portion 39 from the latter.

That is to say, the wire fixing portion 39 of the first contact 20' shown in FIGS. 17(A) and 17(B) is composed of a spring clamp made of an elastic piece which is a member formed separately from the contact main body 30. That is, the wire fixing portion 39 has a straight first extension portion 39c extending along a lower face of the base plate portion 31a of the base portion 31 of the contact main body 30 in the front/back direction and a second extension portion 39e having a chevron in section folded back from a front end of the first extension portion 39c via a first bent portion 39d to extend in the front/back direction. Further, the wire fixing portion 39 has a third extension portion 39g extending upward from a back end of the second extension portion 39e via a second bent portion 39f and a fourth extension portion 39i extending obliquely forward from an upper end of the third extension portion 39g. Then, an end portion of the third extension portion 39g located on the side of the fourth extension portion 39i has an opening 39h receiving a back end of the first extension portion 39c, an end portion of the contact main body 30 located on the back side of the base plate portion 31a of the base portion 31, and an end portion of the contacting member 50 located on the back side of the extension portion 52. Then, the wire fixing portion 39 elastically holds the base plate portion 31a of the contact main body 30 and the end portion of the extension portion 52 located on the back side between the upper face of the first extension portion 39c and the lower edge of the fourth extension portion 39i. The wire fixing portion 39 is formed by stamping and forming a metal plate having a spring property.

When connection of the wire W1 is performed by the wire fixing portion 39 composed of a spring cramp, the second extension portion 39e is put up against an elastic force of the wire fixing portion 39 so that the upper face of the extension portion 52 and the lower edge of the fourth extension portion 39i are opened from each other. Then, the core wire M1 of the wire W1 is inserted into the opening 39h between the upper face of the extension portion 52 and the lower edge of the fourth extension portion 39i so that a pressing-down force against the elastic force of the wire fixing portion 39 is cancelled. Thereby, the wire W1 is fixed to the wire fixing portion 39 in a state where the core wire M1 of the wire W1 has been electrically connected to the extension portion 52 of the contacting member 50.

At this time, since the portion of the contact main body 30 contacting with the contacting member 50 has the insulation layer (not shown), the contacting member 50 and the contact main body 30 can be insulated from each other. Therefore, since current paths joining together do not occur, an electromotive force can be measured with a high accuracy. Further, no electromotive force occurs between the contact main body 30, the contacting member 50, and core wire M1, so that the first contact 20' can be favorably used as a contact for a thermocouple. It should be noted that an insulation layer is not provided on an lower edge of the fourth extension portion 39i so that the fourth extension portion 39i directly contacts with core wire M1, but the wire fixing portion 39 does not have a portion contacting with the contacting member 50. Therefore, since another electric path (a circuit) is not formed, accuracy of electromotive force measurement is not affected.

Further, a modified embodiment of the third contact 120 will be explained with reference to FIGS. 18(A) and 18(B). In FIGS. 18(A) and 18(B), same members as those shown in FIG. 13 to FIG. 16 are denoted with same reference signs and explanation thereof may be omitted.

A basic configuration of a third contact 120' shown in FIGS. 18(A) and 18(B) is the same as that of the first contact 120 shown in FIG. 13 to FIG. 16, but the former is different in configuration of the wire fixing portion 139 from the latter.

That is to say, the wire fixing portion 139 of the third contact 120' shown in FIGS. 18(A) and 18(B) is composed of a spring clamp made of an elastic piece which is a member formed separately from the contact main body 130 like the wire fixing portion 39 shown in FIGS. 17(A) and 17(B). That is, the wire fixing portion 139 has a straight first extension portion 139 extending along a lower face of the base plate 131a of the contact main body 130 in the front/back direction and a second extension portion 139e having a chevron in section folded back from a front end of the first extension portion 139c via a first bent portion 139d to extend in the front/back direction. Further, the wire fixing portion 139 has a third extension portion 139g extending upward from a back end of the second extension portion 139e via the second bent portion 139f and a fourth extension portion 139i extending obliquely forward from an upper end of the third extension portion 139g. Then, an end portion of the third extension portion 139g on the side of the fourth extension portion 139i has an opening 139h receiving a back end of the first extension portion 139c, an end portion of the contact main body 130 on a back side of the base plate portion 131a, and an end portion of the contacting member 150 on a back side of the extension portion 152. Then, the wire fixing portion 139 elastically holds the base plate portion 131a of the contact main body 130 and an end portion of the extension portion 152 on a back side thereof between an upper face of the first extension portion 139c and a lower edge of the fourth extension portion 139i.

Then, when connection of the wire W11 is performed by the wire fixing portion 139 composed of the spring clamp, it is performed in a similar manner to the wire fixing portion 39 shown in FIGS. 17(A) and 17(B).

It should be noted that since an insulation layer (not shown) is provided on a portion of the contact main body 130 contacting with the contacting member 150, the contacting member 150 and the contact main body 130 can be insulated from each other. Therefore, no electromotive force occurs between the contact main body 130, the contacting member 150, and the core wire M11, so that the third contact 120 can be favorably used as a contact for a thermocouple. It should be noted that an insulation layer is not provided on a lower edge of the fourth extension portion 39i, but there is no problem similarly to the wire fixing portion 39 shown in FIGS. 17(A) and 17(B).

The embodiments of the present invention have been explained above, but the present invention is not limited to these embodiments and it can be modified or improved variously.

For example, the first contacts 20 and 20', the second contact 60, the third contact 120 and 120', and the fourth contact 160 may not be used as contacts for a thermocouple.

Therefore, it is not required necessarily that the core wires M1 and M11 of the wires W1 and W11 and the contacting members 50 and 150 are made of metals of the same kind and the contact main body 30 and 130 and the contacting members 50 and 150 are made of metal materials of different kinds.

Further, it is not required necessarily that the core wires M1 and M11 of the wires W1 and W11 and the contacting members 50 and 150 are made of metal materials for a thermocouple.

Furthermore, in the first contact 20, the second contact 60, the third contact 120 and the fourth contact 160), the insulation layer 40 may be provided on at least the portion of the contact main body 30 contacting with the contacting member 50. Therefore, it is not required necessarily that the insulation layers 40 are provided on the entire inner face and the entire outer face of the contact main body 30 and the entire sheared face formed at a stamping time of a conductive metal plate.

It should be noted that chromel is an example of the metal materials for a thermocouple of the core wires M1 and M11 and alumel is an example of the metal materials for a thermocouple of the core wires M2 and M12, but these materials may be metal materials for a thermocouple except for chromel and alumel, for example, constantan, iron, copper, platinum or the like.

Further, the contact of the present invention is not limited to one for a thermocouple and it can be used for applications requiring two independent electric paths in a single contact.

What is claimed is:

1. A contact comprising:
a contact main body having a base portion and a wire fixing portion configured to be fixed with a wire and a contacting member fixing portion for fixing a contacting member arranged on a front side of the base portion;
the contacting member formed separately from the contact main body and configured to be connected to the wire and contact with a mating contact and the contacting member having a fixing portion fixed to the contacting member fixing portion and an extension portion extending backward from the fixing portion up to the wire fixing portion; and
an insulation layer on a portion of the contact main body located between the contact main body and the contacting member, the contact main body contacting with the contacting member.

2. The contact according to claim 1, wherein the wire fixing portion is arranged on a back side of the base portion.

3. The contact according to claim 2, wherein a core wire of the wire is on the extension portion and is connected to the extension portion by the wire fixing portion.

4. The contact according to claim 3, wherein the insulation layer is also on a portion of the wire fixing portion contacting the core wire of the wire in addition to the portion of the contact main body contacting with the contacting member.

5. The contact according to claim 4, wherein the core wire of the wire and the contacting member are made of a metal material of the same kind and the contact main body and the contacting member are made of metal materials of different kinds.

6. The contact according to claim 5, wherein the core wire of the wire and the contacting member are made of metal materials for a thermocouple.

7. The contact according to claim 6, wherein the contacting member has a tab-like contact portion extending forward from the fixing portion for contacting with the mating contact.

8. The contact according to claim 6, wherein the contacting member fixing portion has an approximately box-like shape for receiving the mating contact and has an elastic contacting piece extending from an upper wall of the contacting member fixing portion toward the fixing portion of the contacting member.

9. The contact according to claim 8, wherein the mating contact is received between the fixing portion and the elastic contacting piece to contact with the fixing portion.

10. The contact according to claim 9, wherein the wire fixing portion has a crimping portion for crimping the wire.

11. The contact according to claim 9, wherein the wire fixing portion has a spring clamp.

12. A contact comprising:
a contact main body having:
a wire fixing portion configured to be fixed with a wire; and
a base portion; and
a contacting member fixing portion for fixing a contacting member arranged on a front side of the base portion; and
the contacting member is formed separately from the contact main body and is configured to be connected to the wire and contact with a mating contact, wherein the contacting member comprises:
a fixing portion fixed to the contacting member fixing portion; and
an extension portion extending backward from the fixing portion up to the wire fixing portion, wherein a core wire of the wire is on the extension portion and is connected to the extension portion by the wire fixing portion, and wherein an insulation layer is on a portion of the wire fixing portion contacting the core wire of the wire in addition to the portion of the contact main body contacting with the contacting member.

13. The contact according to claim 12, wherein the core wire of the wire and the contacting member are made of a metal material of the same kind and the contact main body and the contacting member are made of metal materials of different kinds.

14. The contact according to claim 13, wherein the core wire of the wire and the contacting member are made of metal materials for a thermocouple.

15. The contact according to claim 14, wherein the contacting member has a tab-like contact portion extending forward from the fixing portion for contacting with the mating contact.

16. The contact according to claim 14, wherein the contacting member fixing portion has an approximately box-like shape for receiving the mating contact and has an elastic contacting piece extending from an upper wall of the contacting member fixing portion toward the fixing portion of the contacting member.

17. The contact according to claim 16, wherein the mating contact is received between the fixing portion and the elastic contacting piece to contact with the fixing portion.

18. The contact according to claim 17, wherein the wire fixing portion has a crimping portion for crimping the wire.

19. The contact according to claim 17, wherein the wire fixing portion has a spring clamp.

* * * * *